US012677177B2

(12) United States Patent
Elshafie et al.

(10) Patent No.: US 12,677,177 B2
(45) Date of Patent: Jul. 7, 2026

(54) PER-AREA SIGNAL MEASUREMENTS AND REPORTING

(71) Applicant: QUALCOMM Incorporated, San Diego, CA (US)

(72) Inventors: Ahmed Elshafie, San Diego, CA (US); Yu Zhang, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 598 days.

(21) Appl. No.: 18/145,806

(22) Filed: Dec. 22, 2022

(65) Prior Publication Data

US 2024/0214847 A1     Jun. 27, 2024

(51) Int. Cl.
H04W 24/10      (2009.01)
H04B 7/145      (2006.01)
H04B 17/318      (2015.01)

(52) U.S. Cl.
CPC ............ H04W 24/10 (2013.01); H04B 7/145 (2013.01); H04B 17/318 (2015.01)

(58) Field of Classification Search
None
See application file for complete search history.

(56) References Cited

U.S. PATENT DOCUMENTS

| | | | | |
|---|---|---|---|---|
| 2023/0231779 A1* | 7/2023 | Centonza | ............ | H04L 41/5067 |
| | | | | 370/252 |
| 2024/0340668 A1* | 10/2024 | Back | ...................... | H04W 40/12 |
| 2024/0356587 A1* | 10/2024 | Oh | ........................... | H01Q 3/46 |
| 2024/0405807 A1* | 12/2024 | Haija | ................. | H04B 7/04013 |

* cited by examiner

*Primary Examiner* — Walter J Divito
(74) *Attorney, Agent, or Firm* — Procopio, Cory, Hargreaves & Savitch LLP

(57) ABSTRACT

In an aspect, a primary node receives a first request, originating from a network node, to report measurements collected for communication with the network node within an area. The primary node also receives the measurements from multiple UEs in the area. The primary node further reports measurement information collected from the multiple UEs within the area.

30 Claims, 14 Drawing Sheets

902 — Receive a first request, originating from a network node, to report measurements collected for communication with the network node within an area 904 — Receive the measurements from multiple user equipments (UEs) in the area 906 — Report measurement information collected from the multiple UEs within the area

900

Figure 10:
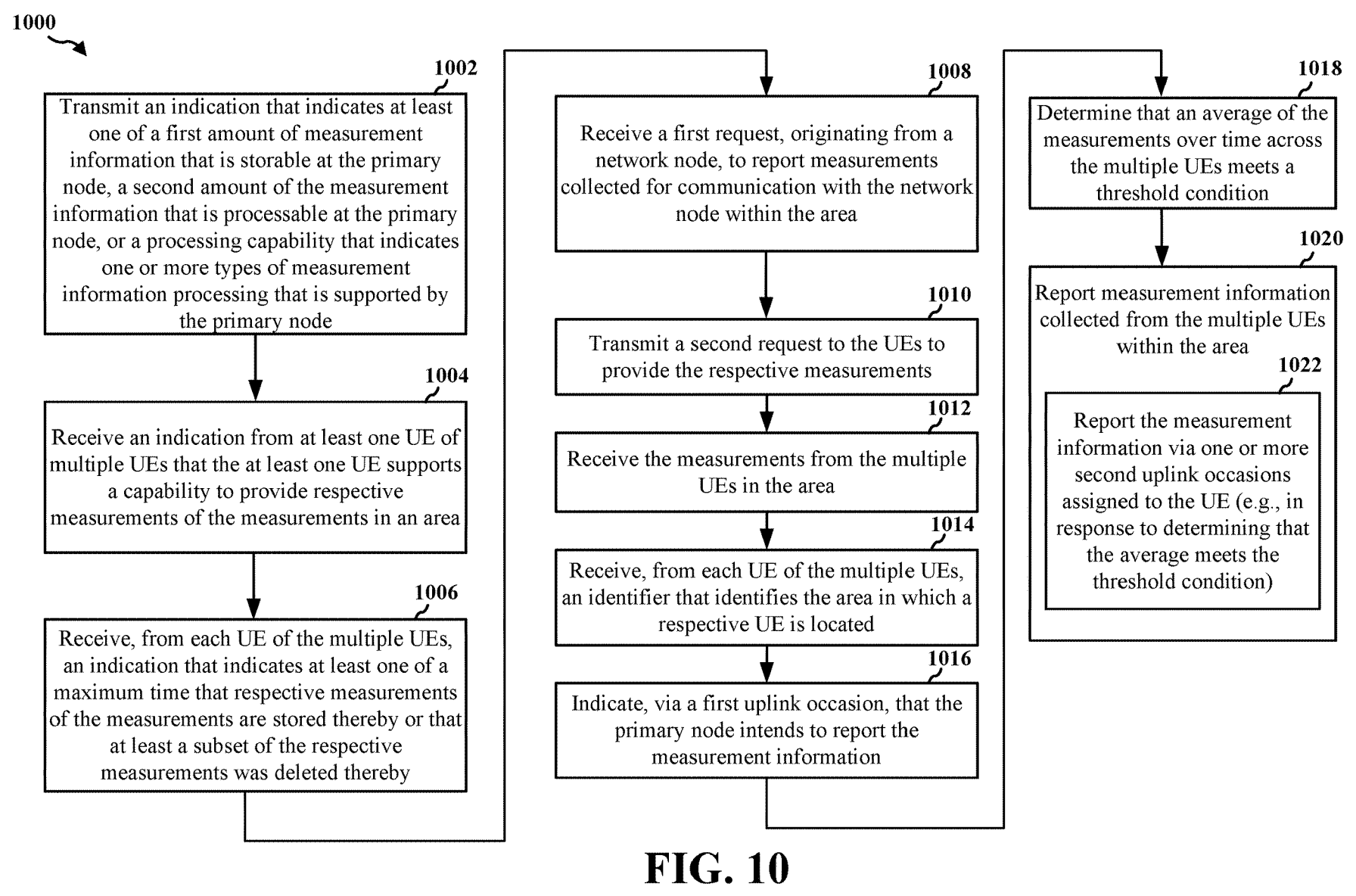

1018 Determine that an average of the measurements over time across the multiple UEs meets a threshold condition

1020 Report measurement information collected from the multiple UEs within the area

1022 Report the measurement information via one or more second uplink occasions assigned to the UE (e.g., in response to determining that the average meets the threshold condition)

1008 Receive a first request, originating from a network node, to report measurements collected for communication with the network node within the area

1010 Transmit a second request to the UEs to provide the respective measurements

1012 Receive the measurements from the multiple UEs in the area

1014 Receive, from each UE of the multiple UEs, an identifier that identifies the area in which a respective UE is located

1016 Indicate, via a first uplink occasion, that the primary node intends to report the measurement information

1002 Transmit an indication that indicates at least one of a first amount of measurement information that is storable at the primary node, a second amount of the measurement information that is processable at the primary node, or a processing capability that indicates one or more types of measurement information processing that is supported by the primary node

1004 Receive an indication from at least one UE of multiple UEs that the at least one UE supports a capability to provide respective measurements of the measurements in an area

1006 Receive, from each UE of the multiple UEs, an indication that indicates at least one of a maximum time that respective measurements of the measurements are stored thereby or that at least a subset of the respective measurements was deleted thereby

Provide a first request to a primary node to report measurements collected for communication with the network node within an area

1104

Receive, from the primary node, measurement information collected from multiple user equipments (UEs) within the area

1100

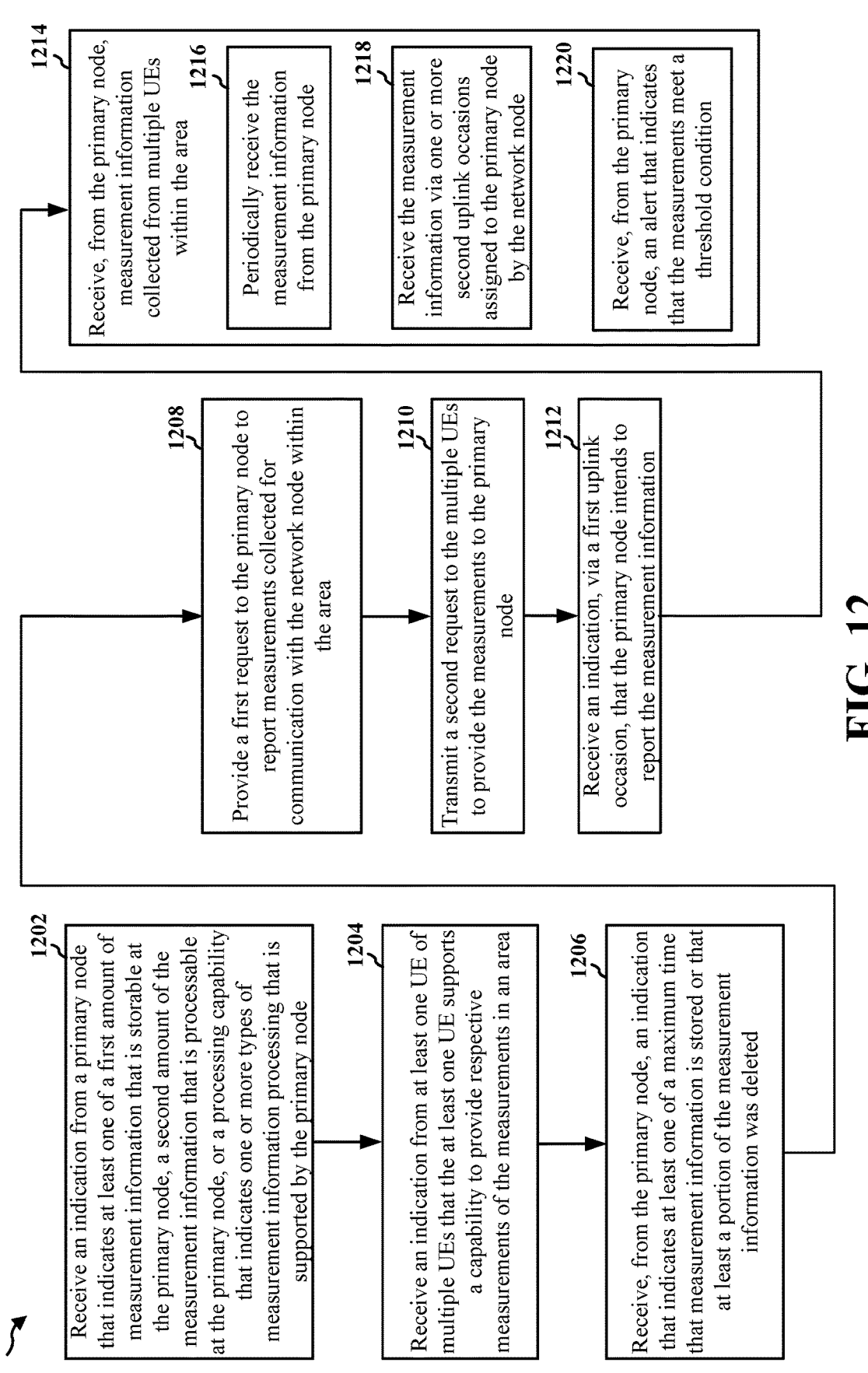

1200

1202 — Receive an indication from a primary node that indicates at least one of a first amount of measurement information that is storable at the primary node, a second amount of the measurement information that is processable at the primary node, or a processing capability that indicates one or more types of measurement information processing that is supported by the primary node 1204 — Receive an indication from at least one UE of multiple UEs that the at least one UE supports a capability to provide respective measurements of the measurements in an area 1206 — Receive, from the primary node, an indication that indicates at least one of a maximum time that measurement information is stored or that at least a portion of the measurement information was deleted 1208 — Provide a first request to the primary node to report measurements collected for communication with the network node within the area 1210 — Transmit a second request to the multiple UEs to provide the measurements to the primary node 1212 — Receive an indication, via a first uplink occasion, that the primary node intends to report the measurement information 1214 — Receive, from the primary node, measurement information collected from multiple UEs within the area 1216 — Periodically receive the measurement information from the primary node 1218 — Receive the measurement information via one or more second uplink occasions assigned to the primary node by the network node 1220 — Receive, from the primary node, an alert that indicates that the measurements meet a threshold condition

FIG. 12

PER-AREA SIGNAL MEASUREMENTS AND REPORTING

TECHNICAL FIELD

The present disclosure relates generally to communication systems, and more particularly, to wireless communications utilizing a reconfigurable intelligent surface (RIS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided are provided for wireless communication. The apparatus may include memory and at least one processor coupled to the memory. Based at least in part on information stored in the memory, the at least one processor may be configured to receive a first request, originating from a network node, to report measurements collected for communication with the network node within an area, receive the measurements from multiple UEs in the area, and report measurement information collected from the multiple UEs within the area.

In an aspect of the disclosure, a method, a computer-readable medium, and an apparatus are provided are provided for wireless communication at a network node. The apparatus may include memory and at least one processor coupled to the memory. Based at least in part on information stored in the memory, the at least one processor may be configured to provide a first request to a primary node to report measurements collected for communication with the network node within an area, and receive, from the primary node, measurement information collected from multiple UEs within the area.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10 is a flowchart illustrating methods of wireless communication, in accordance with various aspects of the present disclosure.

FIG. 12 is a flowchart illustrating methods of wireless communication at a network node, in accordance with various aspects of the present disclosure.

DETAILED DESCRIPTION

Figure 1:
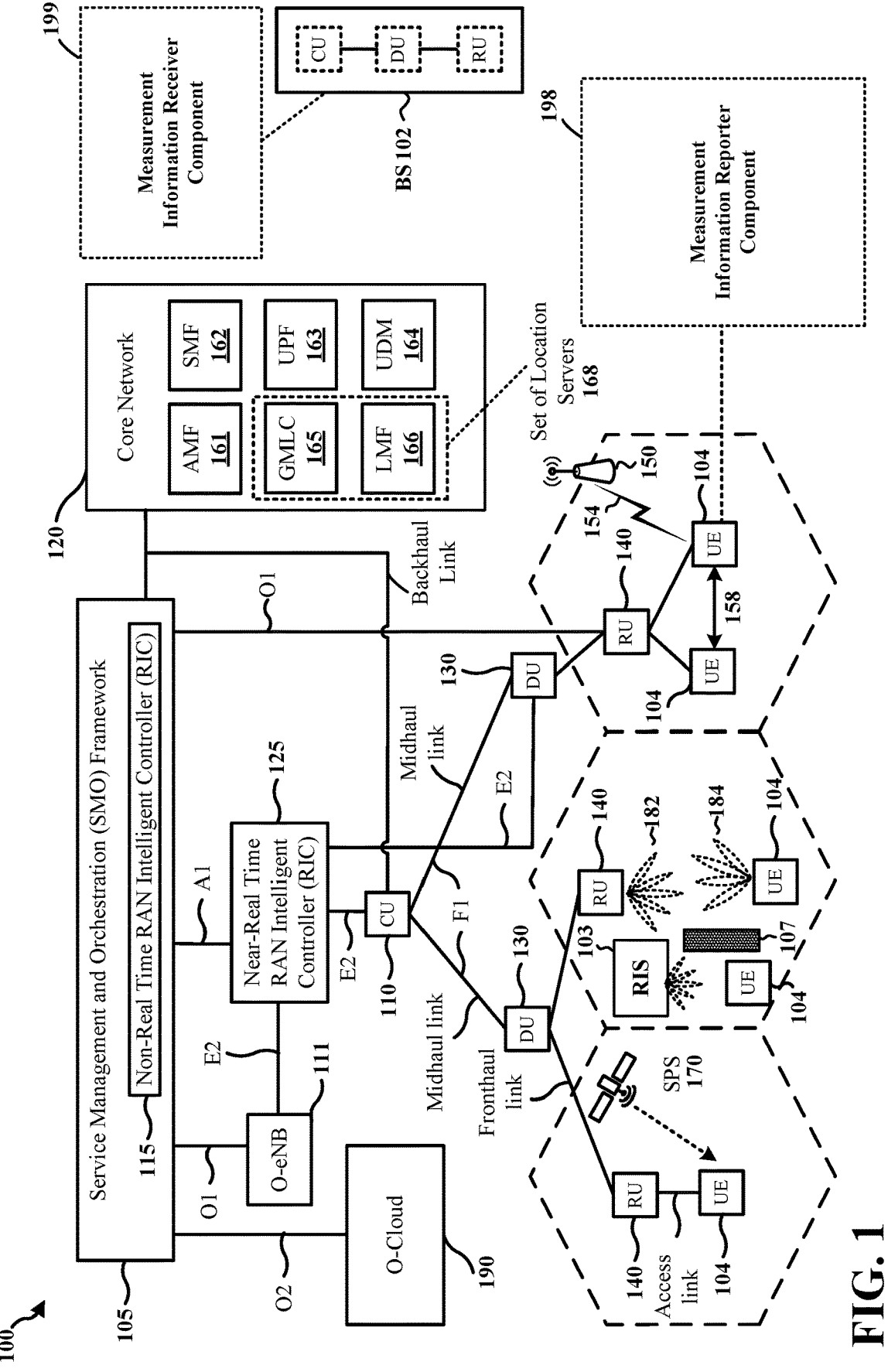
FIG. 1 is a diagram illustrating an example of a wireless communications system and an access network.

Various aspects relate generally to enabling a network to determine whether a RIS is working improperly (e.g., due to security attacks or a blockage). Some aspects more specifically relate to assigning a primary node per area that obtains measurements collected for communication with a network node (e.g., via a beamformed signal from a RIS). In some examples, the measurements for a given RIS configuration and/or the RIS configuration may be reported per zone to the network node. That is, each master node assigned to a particular area may report the measurements collected thereby to the network node. The network node may analyze the measurements and determine whether there is an issue with a RIS (e.g., whether the RIS been compromised (e.g., via a security attack) and/or damaged). Responsive to determining that there is an issue with the RIS, the network (e.g., a network node) may change the network behavior accordingly, for example, by using (e.g., activating) another RIS (e.g., a backup RIS), and/or transmission reception points (TRPs).

Particular aspects of the subject matter described in this disclosure can be implemented to realize one or more of the following potential advantages. In some examples, by providing measurement information associated with a RIS configuration to a network node and determining whether an issue exists with the RIS based on the measurement information, the described techniques can be used to improve and benefit both RIS-based systems and non-RIS-based systems. For example, with respect to RIS-based systems, by detecting security attacks on a RIS or detecting damage on a RIS surface based on the measurement information, a remedial action may be taken to ensure that a proper RIS-based beam is provided to a UE. For example, the network may determine whether a RIS is to be powered on or powered off and/or determine whether a configuration of a RIS is to be changed (which may establish beam training to determine an ideal beam for the UE). Such a remedial action may be triggered based on the measurements provided to the network. With respect to non-RIS-based systems, aspects of the present disclosure may enable the determination of active security attacks (such as, denial of service attacks, jamming, etc.), the determination of weak signal strength (e.g., RSRP)/coverage in each area, and may further assist with green (e.g., energy-efficient) communication networks, where the network node deactivates and/or reduces the power of certain TRPs transmit/receive chains, power amplifiers, antennas, etc., based on the reported measurements.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network.

The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The wireless communications system may further include a reconfiguration intelligent surface (RIS) 103. The RIS 103 may be employed to extend coverage, e.g., beamformed coverage, with lower power consumption. The RIS 103 may be composed of a larger number of uniformly distributed electrically controllable elements. Each RIS element may have a reconfigurable electromagnetic characteristic, e.g., a reflection coefficient. Depending on the combination of configured states of the elements, the RIS 103 may reflect and modify the incident radio waveform in a controlled manner, such as changing a reflected direction, changing a beam width, etc. The RIS 103 may function as a near passive device, and the reflection direction may be controlled by a control node, such as a base station or a UE. For example, the RIS 103 may reflect an impinging wave to a UE in a direction indicated by the base station.

In order to perform RIS-assisted communication/sensing/positioning functions, the base station or UE may use the position of the RIS 103. RIS information may be known by a network if the placement of the RIS 103 was planned by the network, and the base station 102 may transmit information about the RIS 103 to other nodes (e.g., UEs in the cell), e.g., in system information. UEs in the coverage of the cell may receive the system information in order to discover the presence of a RIS, the RIS position, the RIS capabilities, or other RIS information about a particular RIS.

In some aspects, the RIS 103 may reflect beamformed communication between a RU and a UE to avoid a blockage 107 that blocks a directional beam between the RU 140 and the UE 104.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL- TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a component 198 that may be configured to receive a first request, originating from a network node, to report measurements collected for communication with the network node within an area, to receive the measurements from multiple UEs in the area, and to report measurement information collected from the multiple UEs within the area. In certain aspects, the base station 102 may have a component 199 that may be configured to provide a first request to a primary node to report measurements collected for communication with the network node within an area, and to receive, from the primary node, measurement information collected from multiple UEs within the area.

Figures 2A, 2B, 2C, 2D:
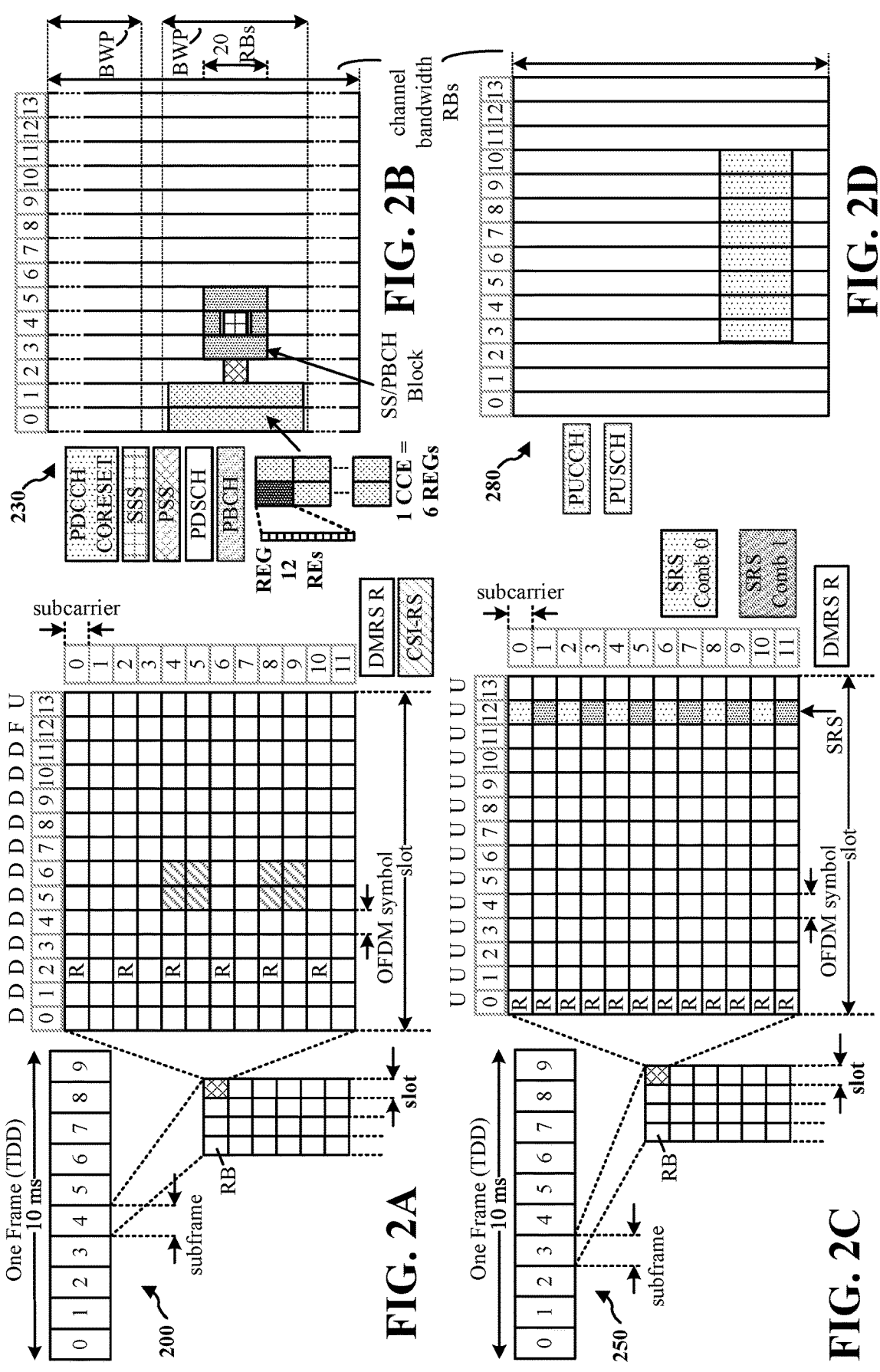
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15[\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
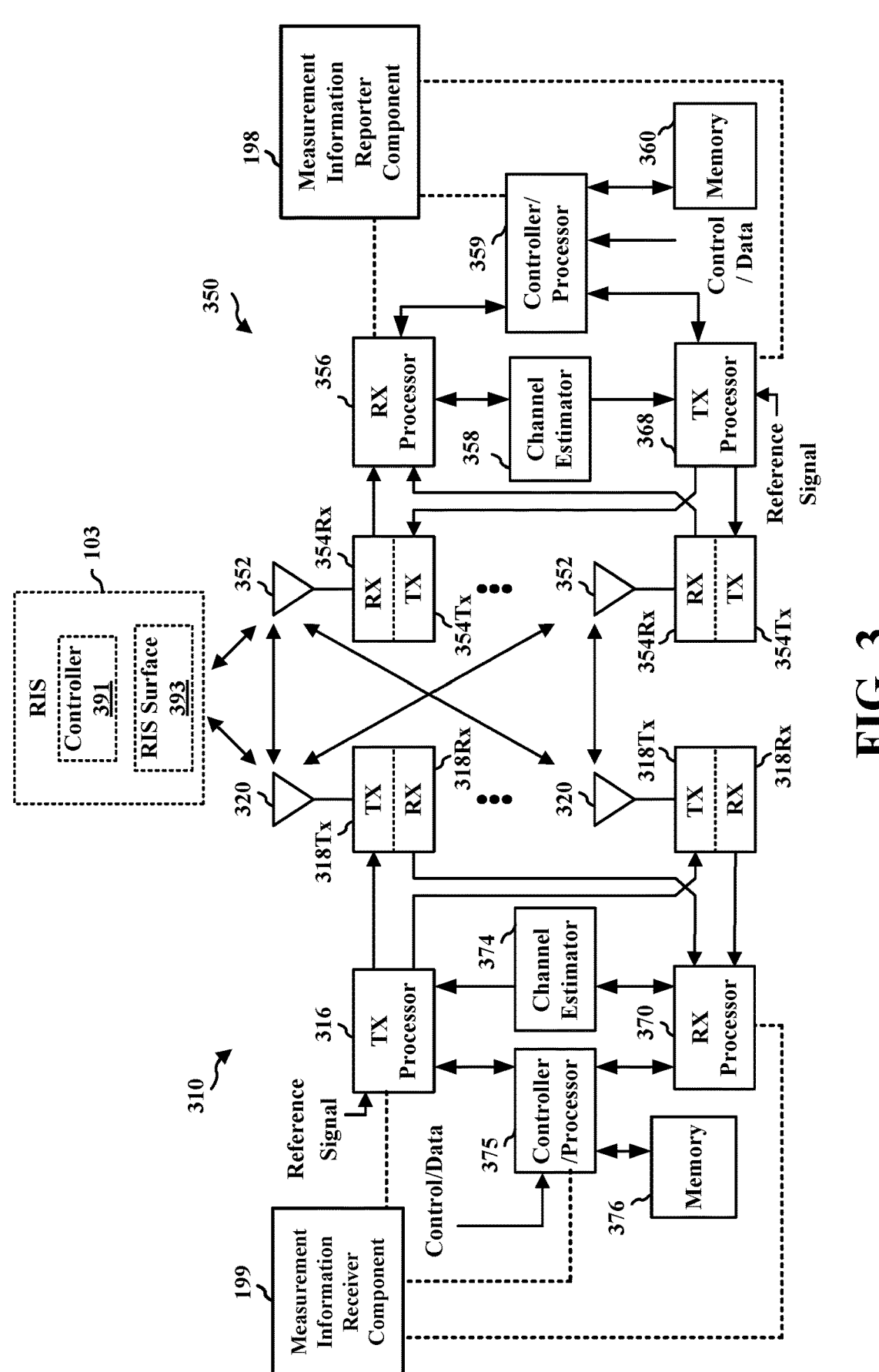
FIG. 3 is a diagram illustrating an example of a base station and user equipment (UE) in an access network.

FIG. 3 is a block diagram of a base station 310 in communication with a UE 350 in an access network. In some aspects, communication between the base station 310 and the UE 350 may be provided by the RIS 103, such as described in connection with any of FIG. 1 or FIGS. 3, 4A, 4B, and 5-8. The communication may be intelligently reflected, e.g., by a RIS surface 393 of the RIS 103. Discovery information, such as RIS capability information and/or position information for the RIS 103 may be transmitted by the controller 391, e.g., via sidelink.

In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement information reporter component 198 of FIG. 1.

At least one of the TX processor 316, the RX processor 370, and the controller/processor 375 may be configured to perform aspects in connection with the measurement information receiver component 199 of FIG. 1.

Massive MIMO may help to increase throughput in a wireless communication system. Beamforming gain may be achieved through the use of active antenna units. Individual RF chains may be used per antenna port. The use of active antenna units (AAU) may increase power consumption. A RIS may be employed to extend coverage, e.g., beamformed coverage, with reduced power consumption. The RIS may include a larger number of uniformly distributed electrically controllable elements. Each RIS element may have a reconfigurable electromagnetic characteristic, e.g., a reflection coefficient. Depending on the combination of configured states of the elements, the RIS may reflect and modify the incident radio waveform in a controlled manner, such as changing a reflected direction, changing a beam width, etc. The RIS may function as a near passive device, and the reflection direction may be controlled by the base station. The RIS may reflect an impinging wave in a direction indicated by the base station to a UE.

A RIS may be deployed in wireless communication systems, including cellular systems, such as LTE, NR, etc. A RIS may alter the channel realization in a controlled manner, which may improve channel diversity. The increased diversity may provide robustness to channel blocking/fading. Compared to a wireless relay or repeater systems, a RIS may be more cost and energy efficient.

Figures 4A, 4B:
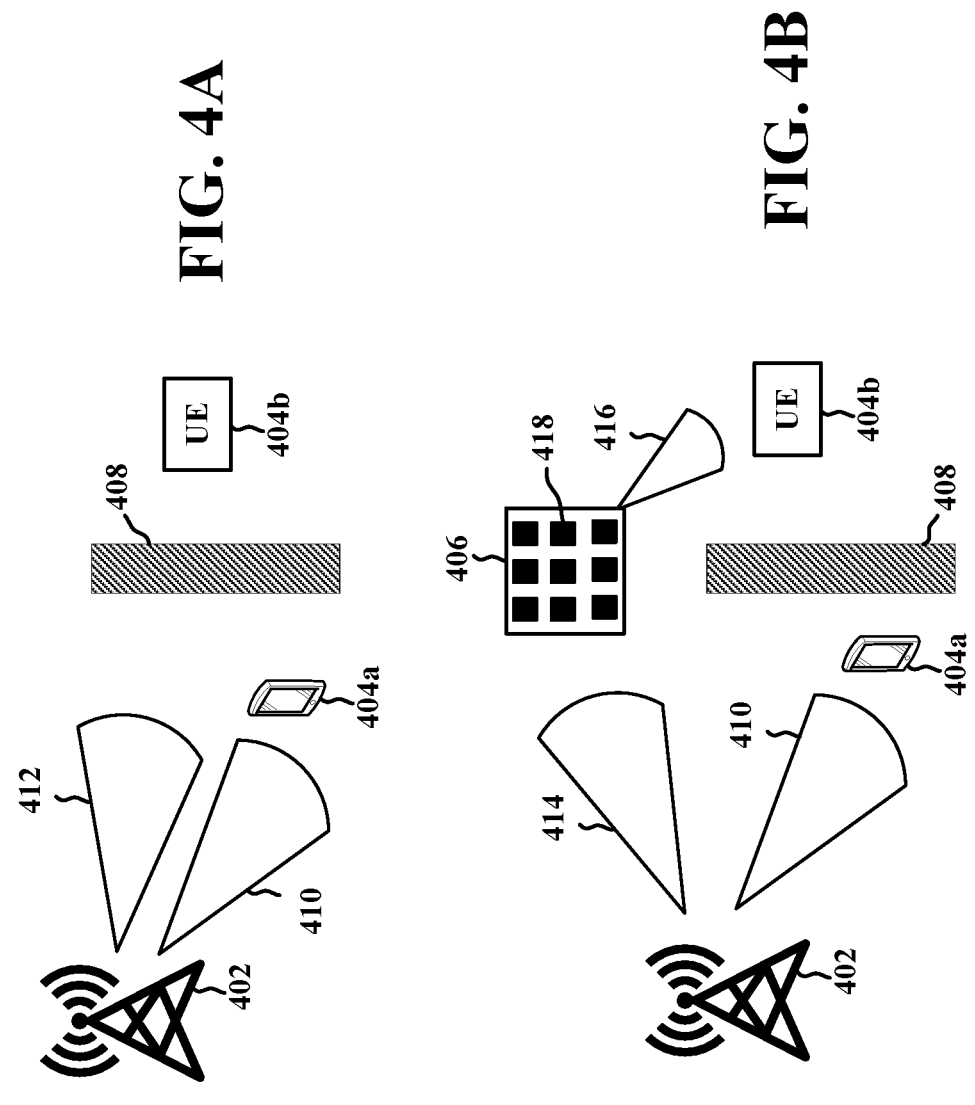
FIG. 4A illustrates an example in which a network node transmits beamformed communication to UEs using directional beams, in accordance with various aspects of the present disclosure.
FIG. 4B illustrates an example in which a network node transmits beamformed communication to UEs via a RIS, in accordance with various aspects of the present disclosure.

A base station may control the RIS to extend beam coverage and/or to address blockages between the base station and the UE. FIG. 4A illustrates an example in which a network node 402 transmits beamformed communication to UEs using directional beams 410 and 412. A first UE 404*a* may be able to receive the direct transmission using the beam 410. However, FIG. 4A illustrates a blockage 408 that blocks the beam 412 from reception at the second UE 404*b*. As illustrated in FIG. 4B, the network node 402 may transmit communication for the second UE 404*b* using a directional beam 414 (which may be referred to as the impinging beam) to the RIS 406 for reflection over a directional beam 416 to the second UE 404*b*. The network node 402 may indicate the direction of the beam 416 to the RIS 406, and the RIS 406 may reflect the impinging wave on beam 414 in the direction of the beam 416.

Figure 5:
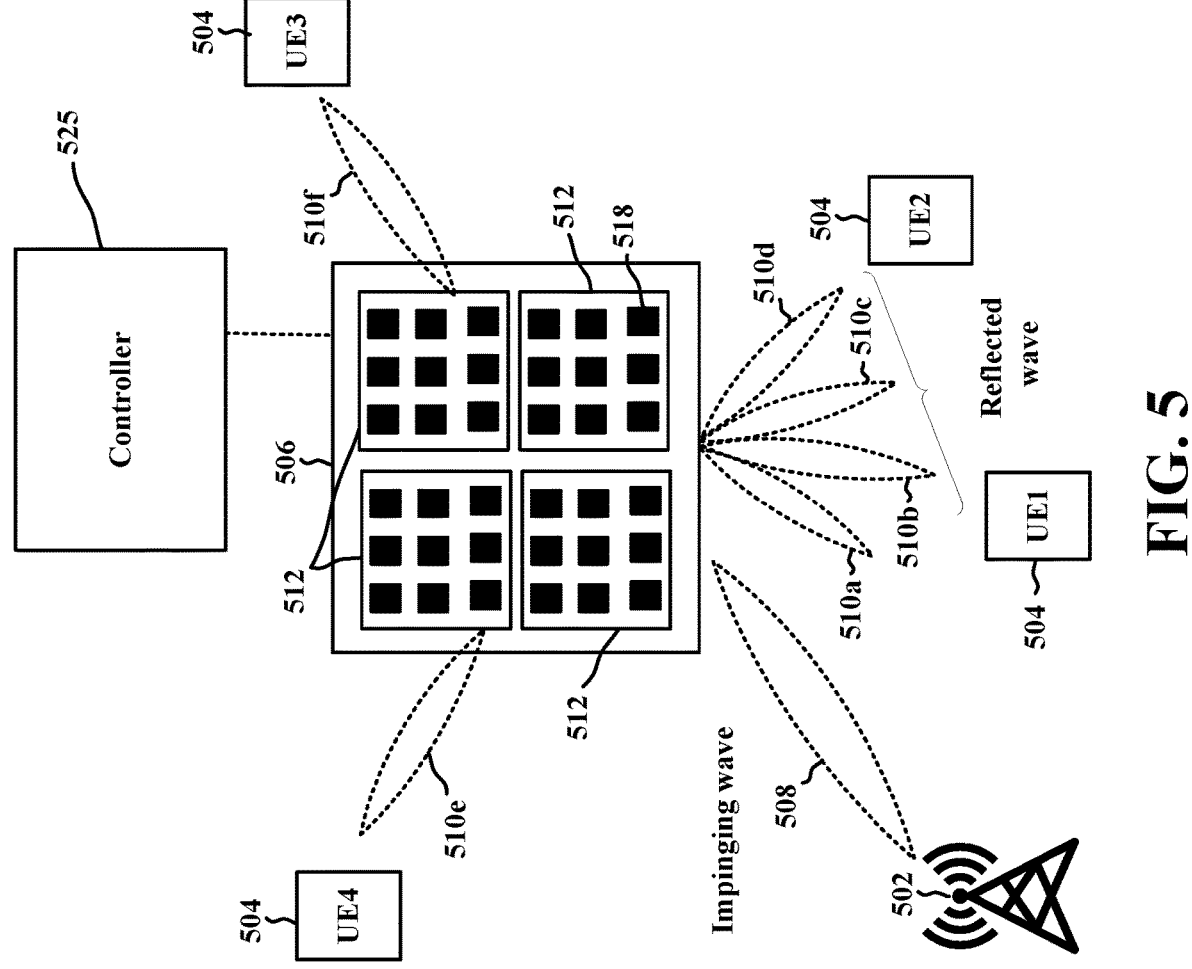
FIG. 5 illustrates an example in which a RIS includes multiple subsets of multiple RIS elements, in accordance with various aspects of the present disclosure.

The RIS 406 may include multiple RIS elements 418 that are configured to adjust the reflected direction, the beam width, etc. FIG. 5 illustrates an example in which a RIS 506 includes multiple subsets 512 of multiple RIS elements 518. As illustrated, different subsets 512 of RIS elements 518 may serve different UEs 504. The RIS elements 518 may be controlled by a controller 525 at the RIS 506 based on control information received by the network node 502 and/or a particular UE of the different UEs 504. As described in connection with FIG. 4B, the network node 502 may indicate a beam direction (e.g., any of 510a, 510b, 510c, 510d, 510e, or 510f) to the RIS 506 for reflecting beamformed communication received as the impinging wave 508 to a particular UE of the different UEs 504 in a particular direction. The RIS 506 may similarly be controlled by a UE (e.g., a particular UE of the different UEs 504) for reflecting communication from the UE to a base station (e.g., the network node 502) and/or to another UE.

A RIS may help in serving UEs in different areas (e.g., zones or sub-zones). As used herein, the term "zone" may be a geographic area of any size and any shape. In some aspects, the zone may be any two-dimensional polygon or three-dimensional polyhedron whose sides and vertices are determined by geographic points, e.g., the latitude and longitude in the case of a polygon or the latitude, longitude and altitude in the case of a polyhedron. As used herein, the term "sub-zone" may be a geographic area of any size or shape within a zone. In some aspects, the sub-zone may be any two-dimensional polygon or three-dimensional polyhedron whose sides are determined by geographic points, e.g., the latitude and longitude in the case of a polygon or the latitude, longitude and altitude in the case of a polyhedron.

A base station and/or a UE (e.g., a sidelink (SL-UE)) may perform a training process utilizing a set of reference signals or via an indication from a base station or a UE to determine an ideal set of coefficients (i.e., Φ) for the RIS elements 518 resulting in a beam having the highest energy accumulation at the UE (i.e., the base station and/or UE determine Φ used at the RIS surface). The determined beam is used to service one or more UEs in a certain zone or sub-zone. However, the RIS service may be degraded or cut off for various reasons (e.g., due to the RIS elements 518 becoming damaged, due to a blockage, due to a security attack that may have hijacked the controller 525 (e.g., a field programmable gate array (FPGA)) to change the beam), etc.

Figure 6:
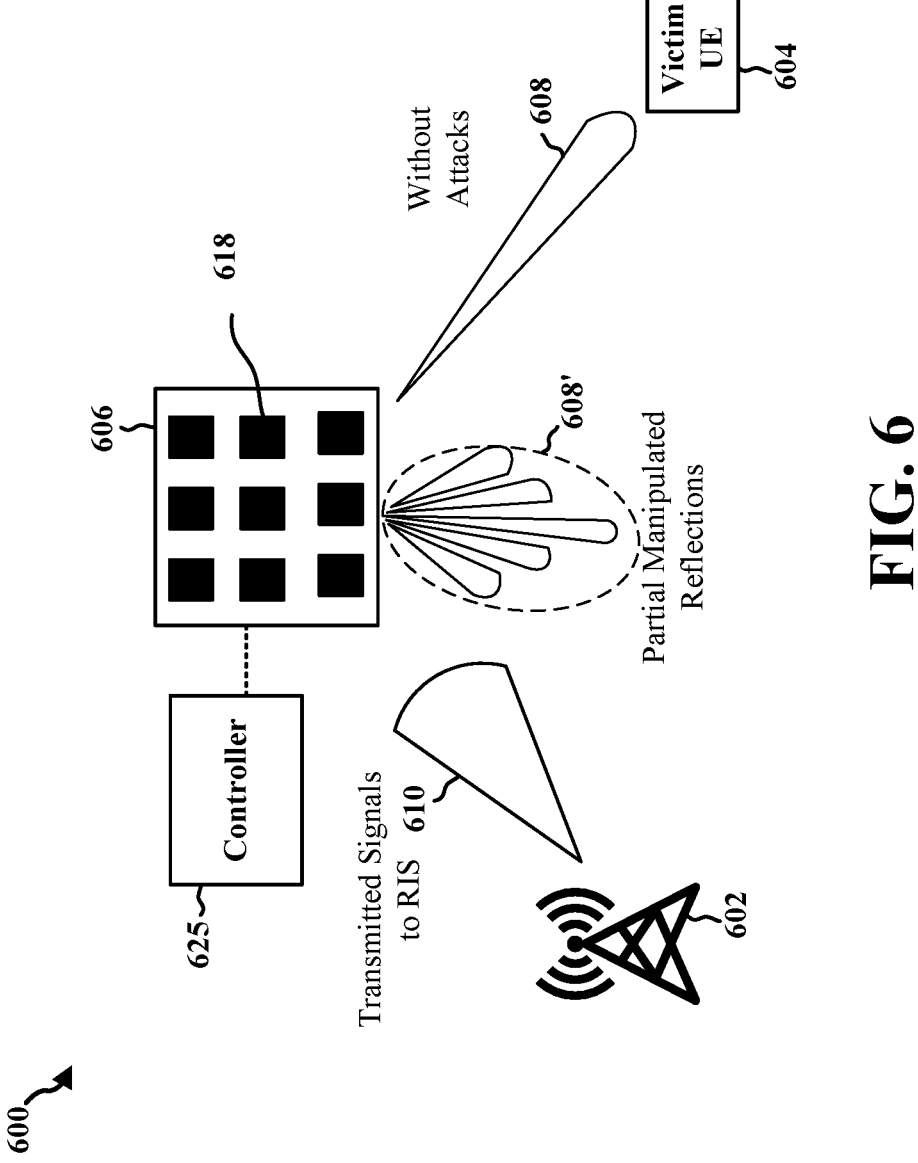
FIG. 6 illustrates a diagram in which a beam of a RIS is changed as a result of an attack on the RIS, in accordance with various aspects of the present disclosure.

For example, FIG. 6 illustrates a diagram 600 in which a beam 608 of a RIS 606 is changed as a result of an attack on the RIS 606. As shown in FIG. 6, a network node 602 may transmit a beam 610 to the RIS 606. In normal circumstances, the RIS 606 may reflect the beam 610 to provide a reflected beam 608 to a UE 604 (which would be provided to the UE 604 if no attack occurred). However, an attacker may change the direction of the beam 608 (shown as beam 608'). Thus, even though a controller 625 of the RIS 606 applied the correct configuration it received (e.g., from a network node 602 or the UE 604), an attacker may be able to change the beam 608 by modifying the coefficients of a subset or all of the RIS elements 618 of the RIS 606 (e.g., Φ is changed to Φ"). As such, the UE 604 becomes a victim of the attack and suffers from a degradation or a loss of the beam 608.

Aspects of the present disclosure enable the network to determine whether a RIS is working improperly (e.g., due to security attacks or a blockage). In accordance with the aspects of the present disclosure, a primary node may be assigned per area that obtains measurements (and/or measurement predictions) collected for communication with a network node (e.g., via a beamformed signal from a RIS). The measurements (e.g., average statistics for signal strength (e.g., RSRP (reference signal received power)/ RSRQ (reference signal received quality)), per-UE AoA (angle-of-arrival) measurements, etc.) for a given RIS configuration), predictions of measurement quantities (e.g., for a future time frame), and/or the RIS configuration may be reported per zone to the network node, for example, via a trigger-based reporting scheme. That is, each master node assigned to a particular area may report the measurements collected thereby to the network node. The network node may analyze the measurements and determine whether there is an issue with a RIS (e.g., whether the RIS has been compromised (e.g., via a security attack) and/or damaged). Responsive to determining that there is an issue with the RIS, the network (e.g., a network node) may change the network behavior accordingly, for example, by using (e.g., activating) another RIS (e.g., a backup RIS), and/or TRPs.

The aspects of the present disclosure may improve RIS-based systems. For example, by detecting security attacks on a RIS or detecting damage on a RIS surface, a remedial action may be taken to ensure that a proper RIS-based beam is provided to a UE. For example, the network may determine whether a RIS is to be powered on or powered off and/or determine whether a configuration of a RIS is to be changed (which may establish beam training to determine an ideal beam for the UE). Such a remedial action may be triggered based on the measurements provided to the network node.

The aspects of the present disclosure may also provide benefits for systems that do not utilize RIS. For example, aspects of the present disclosure may enable the determination of active security attacks (such as, denial of service attacks, jamming, etc.), the determination of weak signal strength (e.g., RSRP)/coverage in each area, and may further assist with green (e.g., energy-efficient) communication networks, where the network node deactivates and/or reduces the power of certain TRPs transmit/receive chains, power amplifiers, antennas, etc., based on the reported measurements.

Figure 7:
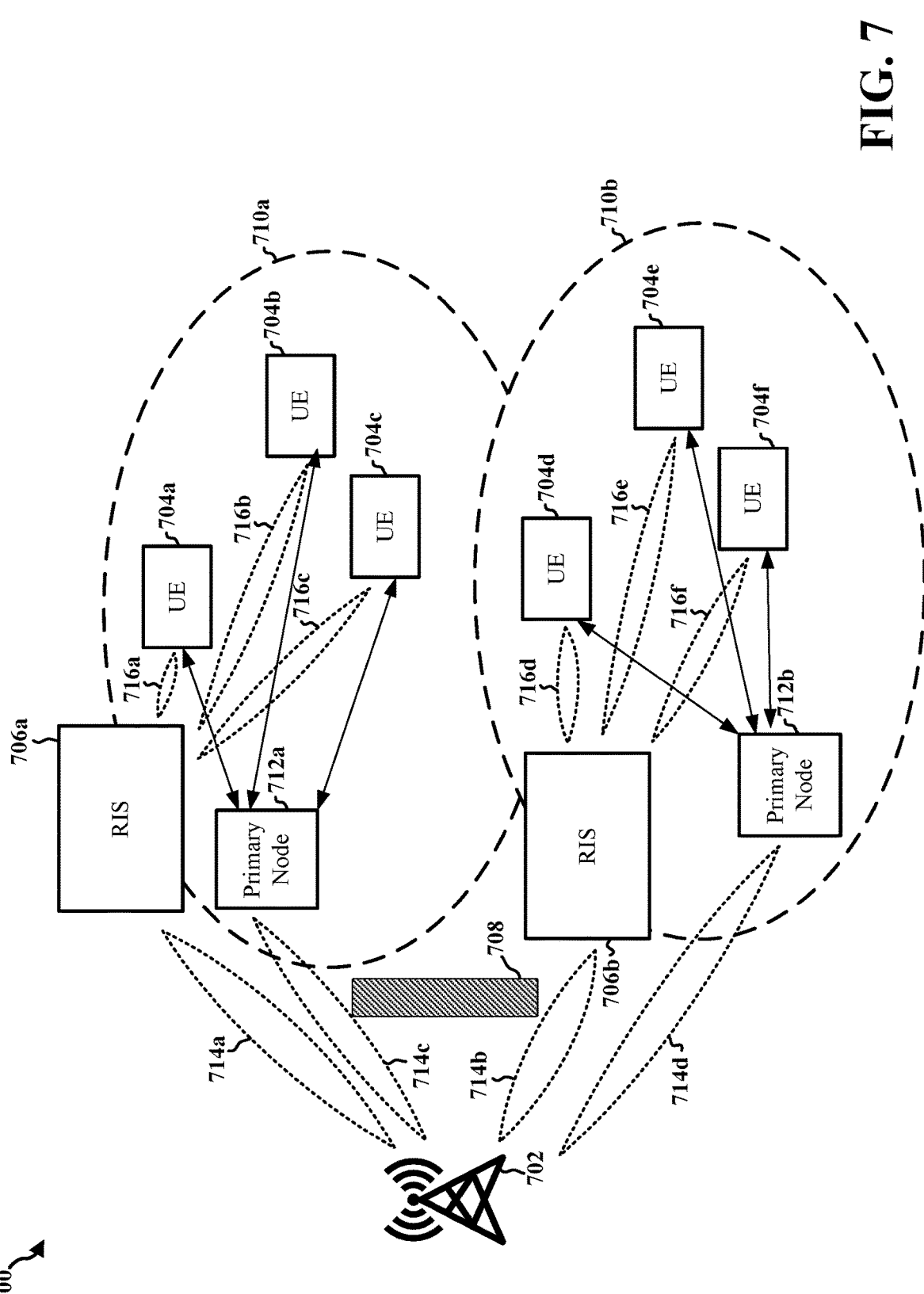
FIG. 7 illustrates a diagram of a system for per-area measurement and reporting, in accordance with various aspects of the present disclosure.

FIG. 7 illustrates a diagram 700 of a system for per-area measurement and reporting in accordance with various aspects of the present disclosure. As shown in FIG. 7, a RIS 706a may reflect a beamformed communication 714a from a network node 702 and for a plurality of UEs (e.g., UEs 704a, 704b, and 704c) in a first area 710a to avoid a blockage 708, and a RIS 706b may reflect a beamformed communication 714b from the network node 702 and for a plurality of UEs (e.g., UEs 704d. 704c, and 704f) in a second area 710b to avoid the blockage 708. The network node 702 may assign a primary node 712a in the first area 710a and assign a primary node 712b in the second area 710b to collect measurements (and/or predictions thereof) across a plurality (e.g., some or all) of UEs (e.g., as many as possible) within a respective area. That is, the network node 702 may assign a primary node per area to collect measurements (and/or predictions thereof) across the area. For instance, the primary node 712a may collect measurements (and/or predictions thereof) across a plurality of UEs 704a, 704b, and 704c in the first area 710a, and the primary node 712b may collect measurements (and/or predictions thereof) across a plurality of UEs 704d. 704c, and 704f in the second area 710b. Each of the primary nodes 712a and 712b may be a UE, a network unit, such as a component of the core network 120, a programmable logic controller (PLC), etc. It is noted that a primary node may also be referred to as a primary device, a master node, master device, a controlling node, or a controlling device.

To assign a primary node for a particular area, the network node 702 may send a request to one or more primary node candidates to be an area master for a set of one or more UEs in the area. One or more of the primary node candidates may accept the request. For instance, each of the accepting candidate(s) may provide a response to the network node 702 indicating that it has accepted the request. The network node 702 may select one or more of the accepting candidate (s) to be the primary node for that area. In some aspects, the network node 702 may determine which of the accepting candidate(s) is to be the primary node based on the capabilities, an amount of power available at and/or supported by the candidate(s), and/or determined position of the candidate (s). For instance, one or more accepting candidates that support measurement reporting, have a power level that meets a threshold condition (e.g., a battery charge that exceeds a determined level) and/or that are closest to the network node 702 may be selected to be the primary node.

In some aspects, the network node 702 and/or the primary nodes 712*a* and/or 712*b* may add UEs within a respective area to perform the measurements and report the measurements to the primary node. For instance, the network node 702 and/or the primary node 712*a* may add UEs within the first area 710*a* to perform the measurements for the first area 710*a* and report the measurements to the primary node 712*a*. Similarly, the network node 702 and/or the primary node 712*b* may add UEs within the second area 710*b* to perform the measurements for the second area 710*b* and report the measurements to the primary node 712*b*. Accordingly, the network node 702 and/or each of the primary nodes 712*a* and/or 712*b* may maintain a list of UEs that participate in collecting measurements. The list may depend on changes based on a UE's capability (e.g., to collect and report measurements), which may be dynamically indicated to a respective primary node and/or the network node 702 using layer 1 (L1), layer 2 (L2), and/or layer 3 (L3) signaling.

In some aspects, a primary node may be an in-coverage node (e.g., node that has a direct connection to the network node 702 without requiring a RIS), for example, in an in-coverage sub-area (e.g., a sub-zone) within an area. For example, the primary node 712*a* may be an in-coverage node, as it is directly connected to the network node 702 without the usage of the RIS 706*a* via a beamformed communication 714*c*. Similarly, the primary node 712*b* may be an in-coverage node, as it is directly connected to the network node 702 without the usage of the RIS 706*b* via a beamformed communication 714*d*.

In some aspects, if a primary node is out of coverage, the primary node may communicate with other in-coverage UEs or primary nodes to provide the measurements to the network node 702. For instance, a primary node (e.g. the primary nodes 712*a* and/or 712*b*) may lose connection to the network node 702 (e.g., by transitioning to a power savings mode or moving to an area not covered by the network node 702). In such a case, the primary node may provide its collected measurements to another device (e.g., another primary node or UE) that is communicatively coupled to the network node 702, and the other device may provide the measurements to the network node 702 on behalf of the out-of-coverage primary node.

In some aspects, the network node and or a primary node may indicate to the UEs the resources in which characteristics (e.g., signal strength) of a beamformed signal from a RIS is to be measured. For instance, the network node 702 and/or the primary node 712*a* may indicate to the UEs 704*a*, 704*b*, and/or 704*c* the resources in which characteristics of the beamformed signals 716*a*. 716*b*, and/or 716*c* from the RIS 706*a* are to be measured, respectively. The network node 702 and/or the primary node 712*b* may indicate to the UEs 704*d*, 704*e*, and/or 704*f* the resources in which characteristics of the beamformed signals 716*d*, 716*e*, and/or 716*f* from the RIS 706*b* are to be measured, respectively.

In some aspects, instead of reporting to a primary node frequently, a UE may collect signal characteristic (e.g., RSRP, RSRQ, SINR (signal-to-interference and noise ratio), CSI, etc.) measurements in its area for a given RIS configuration beamformer (with indication from the network node or a primary node to measure in certain resources, as described above) and report the measurements in various ways. For example, UEs may report measurements to a primary node periodically (e.g., at periodic time intervals). In another example, UEs may report measurements to a primary node responsive to receiving a request from the network node and/or the primary node. In a further example, UEs may report measurements to a primary node response to detecting an event-based trigger. An example of an event-based trigger may be when the UE detects that a signal characteristic measured on a certain reference signal occasion is below a certain threshold or above a certain threshold than a nominal value. A nominal value may be a reference value which was previously-measured using the same RIS configuration and transmit parameters by the network node or reference signal (RS) transmitter. For instance, suppose the UE 704*b* measured a RSRP for the beamformed signal 716*b* to be −44 decibel milliwatts (dBm) at a particular RS occasion. This RSRP may be the nominal value. The UE 704*b* may be configured to report a subsequently-measured RSRP measured at another RS occasion in response to determining that the subsequently-measured RSRP meets a threshold condition with respect to the nominal value (e.g., the subsequently-measured RSRP is above or below the nominal value by a particular amount (e.g., 50 dBm)).

In some aspects, UEs may report their area identification (ID) in a CSI report. For example, the UEs 704*a*, 704*b*, and/or 704*c* may report their area ID in a CSI report transmitted to the primary node 712*a*. In another example, the UEs 704*d*, 704*c*, and/or 704*f* may report their area ID in a CSI report transmitted to the primary node 712*b*.

In some aspects, UEs may measure delta measurements (e.g., across time) and report one or more of the measurements. For example, suppose a UE obtains four measurements X, Y, Z, and L over time. The UE may report all or the last N of the measurements, where N is a positive integer. In another example, the UE may report the initial measurement along with a change (or delta) of the measurements with respect to the initial measurement (e.g., the UE may report X, Y−X, Z−X, or L−X). In a further example, the UE may report the initial measurement along with a delta of the measurements with respect to a configured/preconfigured reference value F for a given signal characteristic (e.g., the UE may report X, Y−F, Z−F, L−F). In yet another example, the UE may report the initial measurement along with a delta of the measurements with respect to the previously-obtained measurement (e.g., the UE may report X, Y−X, Z−Y, L−Z). In still another example, the UE may report the initial measurement along with a delta of the measurements with respect to one or more previously-obtained measurements (e.g., the UE may report X, Y−X, Z−X−Y, L−X−Y−Z (when using the last 3 or all previous measurements) or report X, Y−X, Z−X−Y, L−Y−Z (when using the last 2 previous measurements)).

In some aspects, UEs may report statistics associated with the measurements. For instance, each UE may determine statistics such as, but not limited to, an average of all the measurements for a given signal characteristic, a variance of the measurements for a given signal characteristic, an auto-correlation of the measurements for a given signal characteristic, etc.

In some aspects, UEs may report a down-sampled version of collected measurements in addition to statistics obtained based on the down-sampled measurements and/or all the measurements. For instance, the UEs may report the last M measurements, every other M measurements, etc., where M is a positive integer.

In some aspects, the manner in which a UE may report measurements and/or the type of statistics to be reported may be configured, for example, by the network node 702. For example, the network node 702 may request a UE to provide measurements and/or statistics thereof in accordance with any of the techniques described above.

In some aspects, the number of measurements that a UE can store/buffer and/or process and/or the type of processing that may be performed by a UE may be respective capabilities of the UE. One or more of the capabilities may be static (e.g., based on the UE type). Alternatively, the capability(ies) may be dynamic and change over time. In an aspect in which the capability(ies) are dynamic, the capability(ies) may be indicated using L1, L2, and/or L3 signaling. The capability(ies) that are activated may be based on one or more of the energy status or an amount of power available at the UE (e.g., available at a present time or a future time (based on a prediction at the UE)), an amount of tasks or scheduled data the UE is engaged in or is expected to receive/transmit/perform, whether the UE is in a sleep mode or power savings mode, etc.

In some aspects, the number of measurements/units of information/reports that a primary node can store/buffer and/or process and/or the type of processing that may be performed by a primary node may be respective capabilities of the primary node. One or more of the capabilities may be static (e.g., based on the primary node type). Alternatively, the capability(ies) may be dynamic and change over time. In an aspect in which the capability(ies) are dynamic, the capability(ies) may be indicated using L1, L2, and/or L3 signaling. The capability(ies) that are activated may be based on one or more of the energy status or an amount of power available at the primary node (e.g., available at a present time or a future time (based on a prediction at the primary node), an amount of tasks or scheduled data the primary node is engaged in or is expected to receive/transmit/perform, whether the primary node is in a sleep mode or power savings mode, etc.

In some aspects, because primary nodes and/or UEs may store measurements, measurement predictions, and/or reports for a particular time period (e.g., in a buffer), each primary node and/or UE may report the maximum time it stores measurements, measurement predictions, and/or reports. Each primary node and/or UE may also indicate when it last flushed the measurements, measurement predictions, and/or reports from its buffer. In an aspect in which a UE receives a request to provide measurements, measurement predictions, and/or reports (e.g., from a network node or a primary node), the primary node and/or UE may indicate that it has already flushed its buffer. For example, a UE may receive a request to provide the last Q measurements, where Q is any positive integer. However, the UE may have already flushed T out the last Q measurements, where T is any positive integer less than or equal to Q. In such a case, the UE may indicate that it has Q-T measurements and may provide the Q-T measurements (e.g., if the network node or primary node requests the measurements with such change). Similarly, in an aspect in which a primary node receives a request (e.g., from the network node) to provide reports, the primary node may indicate that it has already flushed its buffer. For example, a primary node may receive request to provide the last Q reports, where Q is any positive integer. However, the primary node may have already flushed T out the last Q reports, where T is any positive integer less than or equal to Q. In such a case, the primary node may indicate that it has Q-T reports and may provide the Q-T reports (e.g., if the network node requests the measurements and/or reports with such change).

In some aspects, a primary node may collect the information (e.g., measurements and/or measurement predictions obtained from the UEs) and report the information to the network node based on some conditions/triggers or periodically. The primary node may perform an analysis on the collected measurements and/or measurement predictions and issue a warning alert when a signal characteristic meets a threshold condition (e.g., when the signal characteristic falls below an expected signal characteristic value or level, when the signal characteristic is higher than an expected signal characteristic value or level, etc.).

In some aspects, UEs may provide measurements and/or measurement predictions to a primary node based on some conditions/triggers or periodically.

To enable event or trigger-based reporting, a configuration similar to scheduling request (SR) configurations may be utilized to indicate that a UE intends to report to a primary node, and that a primary node intends to report to a network node. For instance, sidelink occasions may be utilized to report trigger-based measurements from a UE to a primary node. Uplink occasions maybe utilized to report trigger-based measurements and/or reports from a primary node to a network node. The uplink and sidelink occasions may be resources with a periodicity that is smaller than the measurements.

UEs under conditions of signal characteristic (RSRP, RSRQ. SINR, AoA, CSI, etc.) discrepancy may use the sidelink occasions (e.g., if the RSRP drops by X dB or increases by Y dB, or the AoA changes increases or decreased by a determined amount, etc.). The parameters (or thresholds) (e.g., decibel levels, angle amounts, etc.) used to trigger reporting may be configured via RRC signaling, for example, while configuring the report occasions (per occasion or configuration (e.g., a configuration may have multiple occasions similar to SR or semi-persistent scheduling (SPS)/configured grants (CG)). The parameters may be updated using L3 (or RRC) signaling. L2 (or medium access control-control element (MAC-CE)) signaling, and/or L1 signaling.

Similarly, primary nodes under conditions of signal characteristic (RSRP, RSRQ. SINR, AoA, CSI, etc.) discrepancy may use the uplink occasions. Similar conditions may be configured for primary nodes to report to a network node, where the primary nodes apply thresholds/configurations on their collected information per UE or after averaging across UEs.

In aspect in which measurements and reports are provided periodically, primary nodes and UEs may utilize a periodic resource to provide the measurements and reports (in a similar manner as providing CSI reports). Periodic resources may be utilized to trigger/indicate measurements and/or reports (similar to SR). For example, a primary node can indicate in a PUCCH or uplink occasion that it intends to send a report to a network node. Then, configured or dynamic uplink resources (PUCCH/PUSCH) may be assigned to the primary node, or the primary node may send the report in a MAC-CE similar to buffer status report (BSR). Similarly, a UE can indicate in a sidelink occasion that it intends to send measurements to a primary node. Then, configured or dynamic sidelink resources may be assigned to the UE, or the UE may send the measurements in a MAC-CE similar to buffer status report (BSR).

Referring again to FIG. 7, the network node 702 may analyze the reports and/or alerts received from the primary nodes 712a and 712b to determine whether there is an issue with the RIS 706a and/or 706b. For example, the network node 702 may analyze the reports to determine whether a signal characteristic of the reflected beam(s) provided by the RIS 706a and/or 706b meets a threshold condition (e.g., that a signal characteristic meets or exceed a threshold condition). Responsive to determining that there is an issue with a particular RIS, the network node 702 may deactivate the RIS and/or activate another RIS in the area in which the affected RIS is located to provide reflected beams to the affected UEs.

Figure 8:
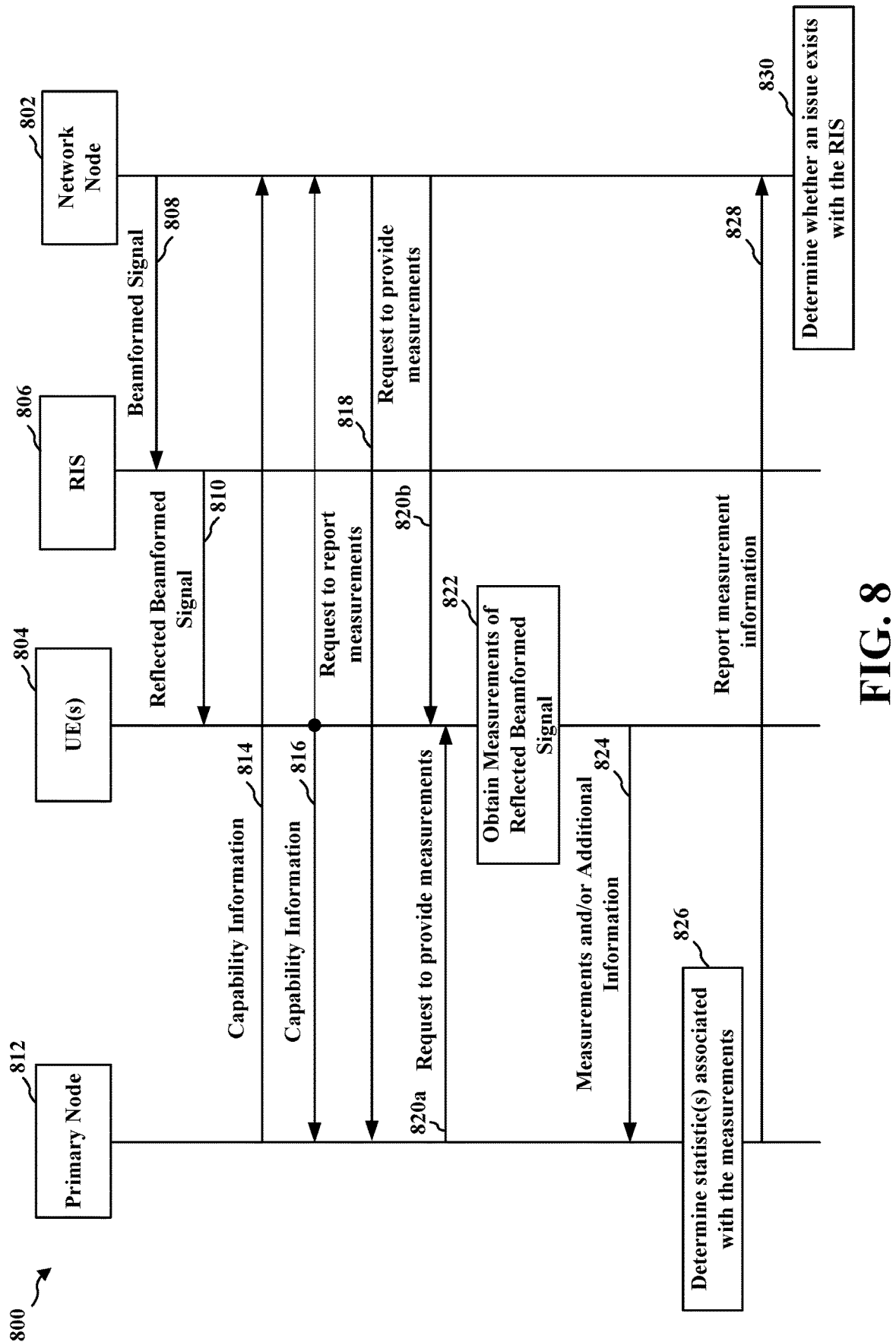
FIG. 8 is a call flow diagram illustrating a method of wireless communication, in accordance with various aspects of this present disclosure.

FIG. 8 is a call flow diagram 800 illustrating a method of wireless communication in accordance with various aspects of this present disclosure. As shown in FIG. 8, the diagram 800 includes a network node 802, UE(s) 804, a primary node 812, and a RIS 806. The network node 802 may be an example of the network node 702, the UE(s) 804 may be an example of the UEs 704a-704f, the primary node 812 may be an example of primary nodes 712a and 712b, and the RIS 806 may be an example of RISs 706a and 706b, as respectively described above with reference to FIG. 7. Each of the network node 802, the UE(s) 804, the RIS 806, and the primary node 812 may be included in a particular area (e.g., a zone or sub-zone). Although aspects are described for the network node 802, the aspects may be performed by a network node in aggregation and/or by one or more components of the network node 802 (e.g., such as a CU 110, a DU 130, and/or an RU 140). As shown in FIG. 8, at 808, the network node 802 may provide a beamformed signal to the RIS 806. At 810, the RIS 806 may reflect the beamformed signal to the UE(s) 804.

At 814, the primary node 812 may provide capability information to the network node 802. The capability information may include an indication that indicates at least one of an amount of the measurement information that is storable at the primary node 812, an amount of the measurement information that is processable at the primary node 812, and/or a processing capability that indicates one or more types of measurement information processing that is supported by the primary node 812 (e.g., the manner in which the primary node 812 may provide the measurement information (e.g., by determining a delta of the measurements across time, by down-sampling the measurement information, etc.), the manner in which the primary node 812 may process the measurement information (e.g., determining statistics associated with the measurement information), etc.). In an aspect, the amount of the measurement information that is storable and/or processable at the primary node 812 may be based on an energy state of the primary node 812, an amount of power available at the primary node 812, an amount of processing tasks scheduled for the primary node 812 (e.g., an amount of processing tasks that the primary node 812 is engaged in or is expected to receive/transmit/perform, and/or a power mode (e.g., a sleep mode or energy savings mode) of the primary node 812).

At 816, the UE(s) 804 may provide capability information to the primary node 812. For example, each of the UE(s) 804 may provide an indication that the UE supports a capability to provide measurements for the reflected beamformed signal provided by the RIS 806. Each of the UE(s) 804 may also provide an indication that indicates a maximum time that measurements obtained by the UE measurements are stored thereby (e.g., in a buffer) and/or that at least a subset of the measurements was deleted thereby (e.g., the UE may provide an indication that its buffer has been flushed and/or when its buffer has been flushed). In an aspect, in addition to and/or in lieu of providing the above-described capability information to the primary node 812, the UE(s) 804 may, at 816, provide the above-described capability information to the network node 802.

At 818, the network node 802 may provide a request to the primary node 812 to report the measurements.

At 820a, the primary node 812 may provide a request to the UE(s) 804 to provide the measurements. The request may be provided responsive to receiving the request from the network node 802 at 818. Although it is noted that in certain aspects, the primary node 812 may provide the request without the network node 802 providing the request to report the measurements at 818. In addition to and/or in lieu of the primary node 812 providing the request to the UE(s) 804 at 820a, the network node 802, at 820b, may provide a request to the UE(s) 804 to provide the measurements to the primary node 812.

At 822, each of the UE(s) 804 obtain measurements of the reflected beamformed signal received at 810. It is noted that the UE(s) 804 may be configured to obtain the measurements without the primary node 812 providing the request at 820a. In certain aspects, the measurements may be signal strength measurements, including, but not limited to, the RSRP of the reflected beamformed signal, the RSRQ of the reflected beamformed signal, the SINR of the reflected beamformed signal, etc. The measurements may also include additional measurements, including, but not limited to, the AoA of the reflected beamformed signal, the CSI associated with the channel by which the reflected beamformed signal is provided, etc.

In certain aspects, each of the UE(s) 804 may determine statistics associated with the measurements obtained thereby (e.g., an average of the measurements for a given signal characteristic, a variance of the measurements for a given signal characteristic, an auto-correlation of the measurements for a given signal characteristic, etc.).

At 824, each of the UE(s) 804 may provide the measurements obtained thereby and/or additional information to the primary node 812. The additional information may include any statistics determined for the measurements by the UE and/or an identifier that identifies the area in which the UE is located.

In certain aspects, each of the UE(s) 804 may provide a sampled subset (e.g., a down-sampled version) of the measurements at 824.

In certain aspects, in addition to and/or in lieu of providing a request, the UE(s) 804 may periodically provide the measurements and/or the additional information at 824 to the primary node 812.

At 826, the primary node 812 may determine statistic(s) associated with the measurements received from the UE(s) 804 (e.g., an average of the measurements received from the UE(s) 804 for a given signal characteristic, a variance of the measurements received from the UE(s) 804 for a given signal characteristic, an auto-correlation of the measurements received from the UE(s) 804 for a given signal characteristic, etc.).

At 828, the primary node 812 may report measurement information (e.g., the measurements and/or associated statistics) collected from the UE(s). In some aspects, the primary node 812 may report the measurement information responsive to receiving the request at 818. In other aspects, the primary node 812 may report the measurement information regardless of receiving the request at 818. For example, the primary node 812 may periodically provide the measurement information to the network node 802. In another example, the primary node 812 may provide the measurement information in response to detecting a triggering event. For example, the primary node 812 may determine that an average (or some other statistical measure) of the measurements over time across the UE(s) 804 meets a threshold condition and report the measurement information in response to determining that the average meets the threshold condition.

In some aspects, the primary node 812 may provide a sampled subset (e.g., a down-sampled version) of the measurements obtained from the UE(s) 804.

In some aspects, at 828, the primary node 812 may provide an alert that indicates the measurements obtained from the UE(s) 804 meet a threshold condition. For example, the primary node 812 may perform an analysis on the collected measurements and issue a warning alert when a signal characteristic meets a threshold condition (e.g., when the signal characteristic falls below an expected signal characteristic value or level, when the signal characteristic is higher than an expected signal characteristic value or level, etc.).

In some aspects, before the primary node 812 reports the measurement information at 828, the primary node 812 indicates to the network node 802, via an uplink occasion, that it intends to report the measurement information. The network node 802 may then assign uplink occasion(s) for the primary node 812 by which the primary node 812 reports the measurement information at 828.

At 830, the network node 802 may determine whether an issue exists with the RIS 806 based on the measurement information received at 828 (e.g., whether the RIS 806 been compromised (e.g., via a security attack) and/or damaged).

Figure 9:
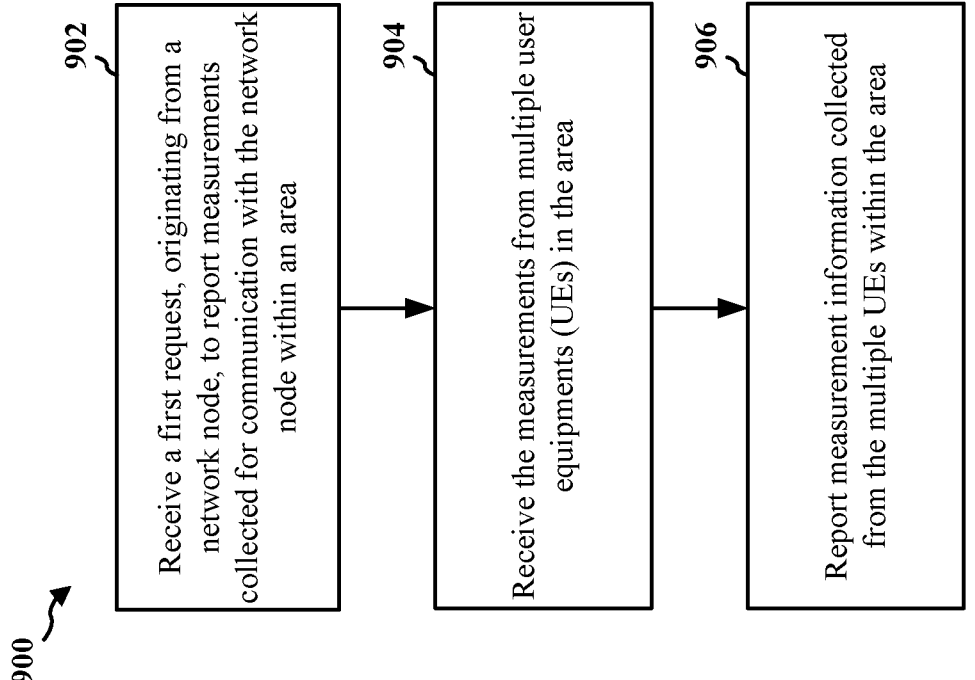
FIG. 9 is a flowchart illustrating methods of wireless communication, in accordance with various aspects of the present disclosure.

FIG. 9 is a flowchart 900 illustrating methods of wireless communication in accordance with various aspects of the present disclosure. The method may be performed by a primary node. The primary node may be the primary node 712a or 712b, or the apparatus 1304 in the hardware implementation of FIG. 13.

As shown in FIG. 9, at 902, the primary node may receive a first request, originating from a network node, to report measurements collected for communication with the network node within an area. For example, referring to FIG. 8, the primary node 812 may, at 818, receive a request, originating from the network node 802, to report measurements collected for communication with the network node 802 within an area. In some aspects, 902 may be performed by the measurement information reporter component 198.

In some aspects, the area corresponds to a zone or a sub-zone. For example, referring to FIG. 7, the area corresponds to one of the first area 710a or the second area 710b.

At 904, the primary node may receive the measurements from multiple UEs in the area. For example, referring to FIG. 8, the primary node 812 may, at 824, receive the measurements from the UE(s) 804 in the area. In some aspects, 904 may be performed by the measurement information reporter component 198.

In some aspects, the measurements are for a beamformed signal from a RIS. For example, referring to FIG. 8, the measurements are for the reflected beamformed signal transmitted by the RIS 806 and received by the UE(s) 804 at 810.

In some aspects, the primary node may periodically receive the measurements from the multiple UEs. For example, referring to FIG. 8, the primary node 812 may, at 824, periodically receive the measurements from the multiple UEs.

In some aspects, the measurements include signal strength measurements. For example, referring to FIG. 8, the measurements received by the primary node 812 at 824 may include signal strength measurements.

In some aspects, the primary node may transmit a second request to the multiple UEs to provide the measurements, where the measurements are received from the multiple UEs responsive to the request. For example, referring to FIG. 8, the primary node 812, at 820a, may transmit a request to the at least one UE of the UE(s) 804 to provide the respective measurements, where the measurements are received from the UE(s) 804 responsive to the request.

In some aspects, the primary node may receive an indication from at least one UE of the multiple UEs that the at least one UE supports a capability to provide respective measurements of the measurements in the area. Responsive to receiving the indication, the primary node may transmit a second request to the at least one UE to provide the respective measurements. For example, referring to FIG. 8, the primary node 812 may, at 816, receive an indication from at least one UE of the UE(s) 804 that the at least one UE supports a capability to provide respective measurements of the measurements in the area. Responsive to receiving the indication, the primary node 812, at 820a, may transmit a request to the at least one UE of the UE(s) 804 to provide the respective measurements.

In some aspects, the primary node may receive, from each UE of the multiple UEs, an indication that indicates at least one of a maximum time that respective measurements of the measurements are stored thereby, or that at least a subset of the respective measurements was deleted thereby. For example, referring to FIG. 8, the primary node 812 may, at 816, may receive from the UE(s) 804 an indication that indicates at least one of a maximum time that respective measurements of the measurements are stored thereby (e.g., in a buffer), or that at least a subset of the respective measurements was deleted thereby (e.g., flushed from the buffer).

In some aspects, the primary node may receive, from each UE of the multiple UEs, an identifier that identifies the area in which a respective UE is located. For example, referring to FIG. 8, at 824, the primary node 812 may receive, from each UE of the UE(s) 804, an identifier that identifies the area in which a respective UE is located.

At 906, the primary node may report measurement information collected from the multiple UEs within the area. For example, referring to FIG. 8, the primary node 812 may, at 828, report measurement information collected from the UE(s) 804 within the area. In some aspects, 906 may be performed by the measurement information reporter component 198.

In some aspects, the primary node may be a UE that may transmit an indication that indicates at least one of a first amount of the measurement information that is storable at the UE, a second amount of the measurement information that is processable at the UE, or a processing capability that indicates one or more types of measurement information processing that is supported by the UE. For example, referring to FIG. 8, the primary node 812 may be a UE that may, at 814, transmit an indication that indicates at least one of an amount of the measurement information that is storable at the UE (i.e., the primary node 812), an amount of the measurement information that is processable at the UE, or a processing capability that indicates one or more types of measurement information processing that is supported by the UE.

In some aspects, the first amount and the second amount are based on at least one of an energy status of the UE, a third amount of power available at the UE, a fourth amount of processing tasks scheduled for the UE, or a power mode of the UE. For example, referring to FIG. 8, the amount of the measurement information storable at the UE (i.e., the primary node 812) and the amount of the measurement information that is processable at the UE indicated at 814 may be based on at least one of energy status of the UE (i.e., the primary node 812), a third amount of power available at the UE, a fourth amount of processing tasks scheduled for the UE, or a power mode of the UE.

In some aspects, the primary node may be a UE that may indicate, via a first uplink occasion, that the UE intends to report the measurement information. The primary node may report the measurement information via one or more second uplink occasions assigned to the UE. For example, referring to FIG. 8, the UE (i.e., the primary node 812) may indicate to the network node 802, via a first uplink occasion, that the UE intends to report the measurement information. The UE may, at 828, report the measurement information via second uplink occasion(s) assigned to the UE by the network node 802.

In some aspects, the primary node may determine that an average of the measurements over time across the multiple UEs meets a threshold condition, where the measurement information is reported via the second uplink occasion(s) in response to determining that the average meets the threshold condition. For example, referring to FIG. 8, the primary node 812, at 826 may determine an average of the measurements (received at 824) over time across the UE(s) 804 meets a threshold condition. The primary node 812 may, at 828, report the measurement information via the second uplink occasion(s) in response to determining that the average meets the threshold condition.

In some aspects, the primary node may periodically report the measurement information via the second uplink occasion(s). For example, referring to FIG. 8, the primary node 812 may periodically report the measurement information at 828 via second uplink occasion(s).

In some aspects, the measurement information may include one or more statistics associated with the measurements. For example, referring to FIG. 8, the measurement information provided by the primary node 812 at 828 may include the statistic(s) associated with the measurements determined by the primary node 812 at 826.

In some aspects, the measurement information may include a sampled subset of the measurements. For example, referring to FIG. 8, the measurement information provided by the primary node 812 at 828 may include a sampled subset of the measurements (e.g., a down-sampled version of the measurements).

FIG. 10 is a flowchart 1000 illustrating methods of wireless communication in accordance with various aspects of the present disclosure. The method may be performed by a primary node. The primary node may be the primary node 712a or 712b, the primary node 812, or the apparatus 1304 in the hardware implementation of FIG. 13.

As shown in FIG. 10, at 1002, a primary node (which may be a UE) may transmit an indication that indicates at least one of a first amount of the measurement information that is storable at the primary node, a second amount of the measurement information that is processable at the primary node, or a processing capability that indicates one or more types of measurement information processing that is supported by the primary node. For example, referring to FIG. 8, the primary node 812 may be a UE that may, at 814, transmit an indication that indicates at least one of an amount of the measurement information that is storable at the primary node 812, an amount of the measurement information that is processable at the primary node 812, or a processing capability that indicates one or more types of measurement information processing that is supported by the primary node 812.

In some aspects, the first amount and the second amount are based on at least one of an energy status of the primary node, a third amount of power available at the primary node, a fourth amount of processing tasks scheduled for the primary node, or a power mode of the UE. For example, referring to FIG. 8, the amount of the measurement information storable at the primary node 812 and the amount of the measurement information that is processable at the primary node 812 indicated at 814 may be based on at least one of energy status of the primary node 812, a third amount of power available at the primary node 812, a fourth amount of processing tasks scheduled for the UE, or a power mode of the primary node 812.

At 1004, the primary node may receive an indication from at least one UE of multiple UEs that the at least one UE supports a capability to provide respective measurements of the measurements in an area. For example, referring to FIG. 8, the primary node 812 may, at 816, receive an indication from at least one UE of the UE(s) 804 that the at least one UE supports a capability to provide respective measurements of the measurements in the area.

In some aspects, the area corresponds to a zone or a sub-zone. For example, referring to FIG. 7, the area corresponds to one of the first area 710a or the second area 710b.

At 1006, the primary node may receive, from each UE of the multiple UEs, an indication that indicates at least one of a maximum time that respective measurements of the measurements are stored thereby, or that at least a subset of the respective measurements was deleted thereby. For example, referring to FIG. 8, the primary node 812 may, at 816, may receive from the UE(s) 804 an indication that indicates at least one of a maximum time that respective measurements of the measurements are stored thereby (e.g., in a buffer), or that at least a subset of the respective measurements was deleted thereby (e.g., flushed from the buffer).

At 1008, the primary node may receive a first request, originating from a network node, to report measurements collected for communication with the network node within the area. For example, referring to FIG. 8, the primary node 812 may, at 818, receive a request, originating from the network node 802, to report measurements collected for communication with the network node 802 within the area.

At 1010, the primary node may transmit a second request to the UE(s) to provide the respective measurements. For example, referring to FIG. 8, the primary node, at 820a, may transmit a request to the at least one UE of the UE(s) 804 to provide the respective measurements, where the measurements are received from the UE(s) 804 responsive to the request. In some aspects, the primary node 812 may transmit the second request responsive to receiving the indication (at 1004) from the UE(s) 804 that the UE(s) 804 support a capability to provide respective measurements of the measurements in the area.

At 1012, the primary node may receive the measurements from the multiple UEs in the area. For example, referring to FIG. 8, the primary node 812 may, at 824, receive the measurements from the UE(s) 804 in the area.

In some aspects, the measurements are for a beamformed signal from a RIS. For example, referring to FIG. 8, the measurements are for the reflected beamformed signal transmitted by the RIS 806 and received by the UE(s) 804 at 810.

In some aspects, the primary node may periodically receive the measurements from the multiple UEs. For example, referring to FIG. 8, the primary node 812 may, at 824, periodically receive the measurements from the multiple UEs.

In some aspects, the measurements may include signal strength measurements. For example, referring to FIG. 8, the measurements received by the primary node 812 at 824 may include signal strength measurements.

At 1014, the primary node may receive, from each UE of the multiple UEs, an identifier that identifies the area in which a respective UE is located. For example, referring to FIG. 8, at 824, the primary node 812 may receive, from each UE of the UE(s) 804, an identifier that identifies the area in which a respective UE is located.

At 1016, the primary node may be a UE that may indicate, via a first uplink occasion, that the UE intends to report the measurement information. For example, referring to FIG. 8, the UE (i.e., the primary node 812) may indicate to the network node 802, via a first uplink occasion, that the UE intends to report the measurement information.

At 1018, the primary node may determine that an average of the measurements over time across the multiple UEs meets a threshold condition. For example, referring to FIG. 8, the primary node 812, at 826 may determine an average of the measurements (received at 824) over time across the UE(s) 804 meets a threshold condition.

At 1020, the primary node may report measurement information collected from the multiple UEs within the area. For example, referring to FIG. 8, the primary node 812 may, at 828, report measurement information collected from the UE(s) 804 within the area.

In some aspects, the primary node may report the measurement information via one or more second uplink occasions assigned to the primary node (in a scenario in which the primary node is a UE). For example, referring to FIG. 8, the primary node may, at 828, report the measurement information via second uplink occasion(s) assigned to the UE by the network node 802.

In some aspects, as part of 1020, at 1022, the primary node may report the measurement information via the second uplink occasion(s) in response to determining that the average meets the threshold condition. For example, referring to FIG. 8, the primary node 812 may, at 828, report the measurement information via the second uplink occasion(s) in response to determining that the average meets the threshold condition.

In some aspects, the primary node may periodically report the measurement information via the second uplink occasion(s). For example, referring to FIG. 8, the primary node 812 may periodically report the measurement information at 828 via second uplink occasion(s).

In some aspects, the measurement information may include one or more statistics associated with the measurements. For example, referring to FIG. 8, the measurement information provided by the primary node 812 at 828 may include the statistic(s) associated with the measurements determined by the primary node 812 at 826.

In some aspects, the measurement information may include a sampled subset of the measurements. For example, referring to FIG. 8, the measurement information provided by the primary node 812 at 828 may include a sampled subset of the measurements (e.g., a down-sampled version of the measurements).

Figure 11:
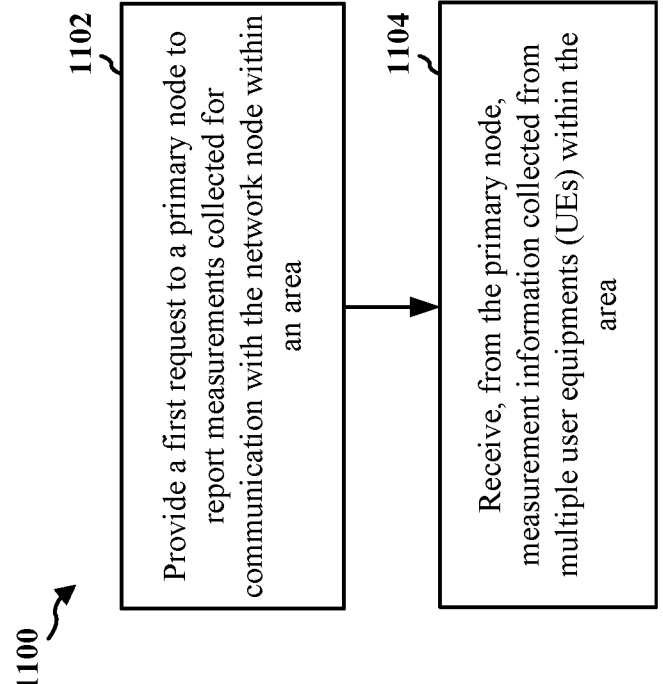
FIG. 11 is a flowchart illustrating methods of wireless communication at a network node, in accordance with various aspects of the present disclosure.

FIG. 11 is a flowchart 1100 illustrating methods of wireless communication at a network node in accordance with various aspects of the present disclosure. The network node may be a base station, or a component of a base station, in the access network of FIG. 1 or a core network component (e.g., base station 102, 310; the CU 110, the DU 130; the RU 140; network node 402, 502, 602, 702 or 802; or the network entity 1402 in the hardware implementation of FIG. 14).

As shown in FIG. 11, at 1102, the network node may provide a first request to a primary node to report measurements collected for communication with the network node within an area. For example, referring to FIG. 8, the network node 802 may, at 818, provide a request to the primary node 812 to report measurements collected for communication with the network node 802 within an area. In some aspects, 1102 may be performed by the measurement information receiver component 199.

In some aspects, the measurements are for a beamformed signal from a RIS. For example, referring to FIG. 8, the measurements are for the reflected beamformed signal transmitted by the RIS 806 and received by the UE(s) 804 at 810.

In some aspects, the area corresponds to a zone or a sub-zone. For example, referring to FIG. 7, the area corresponds to one of the first area 710*a* or the second area 710*b*.

In some aspects, the network node may receive an indication from the primary node that indicates at least one of a first amount of the measurement information that is storable at the primary node, a second amount of the measurement information that is processable at the primary node, or a processing capability that indicates one or more types of measurement information processing that is supported by the primary node. For example, referring to FIG. 8, the network node 802, at 814, may receive an indication that indicates at least one of an amount of the measurement information that is storable at the primary node 812, an amount of the measurement information that is processable at the primary node 812, or a processing capability that indicates one or more types of measurement information processing that is supported by the primary node 812.

In some aspects, the primary node may receive, from the primary node, an indication that indicates at least one of a maximum time that the measurement information is stored, or that at least a portion of the measurement information was deleted. For example, referring to FIG. 8, the network node 802, at 814, may receive from the primary node 812 an indication that indicates at least one of a maximum time that the measurement information is stored (e.g., in a buffer), or that at least a portion of the measurement information was deleted (e.g., flushed from the buffer).

In some aspects, the measurements may include signal strength measurements. For example, referring to FIG. 8, the measurements received by the primary node 812 at 824 may include signal strength measurements.

At 1104, the network node may receive, from the primary node, measurement information collected from multiple UEs within the area. For example, referring to FIG. 8, the network node 802 may, at 828, receive, from the primary node 812 measurement information collected from UE(s) 804 within the area. In some aspects, 1104 may be performed by the measurement information receiver component 199.

In some aspects, the network node may transmit a second request to the multiple UEs to provide the measurements to the primary node. For example, referring to FIG. 8, the network node 802, at 820*b*, may transmit a request to the UE(s) 804 to provide the respective measurements to the primary node 812.

In some aspects, the network node may receive an indication from at least one UE of the multiple UEs that the at least one UE supports a capability to provide respective measurements of the measurements in the area. Responsive to receiving the indication, the network node may transmit a second request to the at least one UE to provide the respective measurements. For example, referring to FIG. 8, the network node 802 may, at 816, receive an indication from at least one UE of the UE(s) 804 that the at least one UE supports a capability to provide respective measurements of the measurements in the area. Responsive to receiving the indication, the network node 802, at 820*b*, may transmit a request to the at least one UE of the UE(s) 804 to provide the respective measurements to the primary node 812.

In some aspects, the network node may periodically receive the measurement information from the primary node. For example, referring to FIG. 8, the network node 802, at 828, may periodically receive the measurement information from the primary node 812.

In some aspects, the network node may receive, via a first uplink occasion, an indication that the primary node intends to report the measurement information. The network node may receive the measurement information via second uplink occasion(s) assigned to the primary node by the network node. For example, referring to FIG. 8, the network node 802 may receive, via a first uplink occasion, an indication that the primary node 812 intends to report the measurement information. The network node 802 may, at 828, receive the measurement information via second uplink occasion(s) assigned to the primary node 812 by the network node 802.

In some embodiments, the network node may receive, from the primary node, an alert that indicates that the measurements meet a threshold condition. For example, referring to FIG. 8, the network node 802 may, at 828, receive, from the primary node 812, an alert that indicates that the measurements meet a threshold condition.

In some aspects, the measurement information may include one or more statistics associated with the measurements. For example, referring to FIG. 8, the measurement information received by the network node 802 at 828 may include the statistic(s) associated with the measurements determined by the primary node 812 at 826.

In some aspects, the measurement information may include a sampled subset of the measurements. For example, referring to FIG. 8, the measurement information received by the network node 802 at 828 may include a sampled subset of the measurements (e.g., a down-sampled version of the measurements).

FIG. 12 is a flowchart 1200 illustrating methods of wireless communication at a network node in accordance with various aspects of the present disclosure. The network node may be a base station, or a component of a base station, in the access network of FIG. 1 or a core network component (e.g., base station 102, 310; the CU 110, the DU 130; the RU 140; network node 402, 502, 602, 702 or 802; or the network entity 1402 in the hardware implementation of FIG. 14).

At 1202, the network node may receive an indication from a primary node that indicates at least one of a first amount of measurement information that is storable at the primary node, a second amount of the measurement information that is processable at the primary node, or a processing capability that indicates one or more types of measurement information processing that is supported by the primary node. For example, referring to FIG. 8, the network node 802, at 814, may receive an indication that indicates at least one of an amount of the measurement information that is storable at the primary node 812, an amount of the measurement information that is processable at the primary node 812, or a processing capability that indicates one or more types of measurement information processing that is supported by the primary node 812.

At 1204, the network node may receive an indication from at least one UE of multiple UEs that the at least one UE supports a capability to provide respective measurements of the measurements in the area. For example, referring to FIG. 8, the network node 802 may, at 816, receive an indication from at least one UE of the UE(s) 804 that the at least one UE supports a capability to provide respective measurements of the measurements in the area.

At 1206, the network node may receive, from the primary node, an indication that indicates at least one of a maximum time that the measurement information is stored, or that at least a portion of the measurement information was deleted. For example, referring to FIG. 8, the network node 802, at 814, may receive from the primary node 812 an indication that indicates at least one of a maximum time that the measurement information is stored (e.g., in a buffer), or that at least a portion of the measurement information was deleted (e.g., flushed from the buffer).

At 1208, the network node may provide a first request to the primary node to report measurements collected for communication with the network node within the area. For example, referring to FIG. 8, the network node 802 may, at 818, provide a request to the primary node 812 to report measurements collected for communication with the network node 802 within an area.

In some aspects, the measurements are for a beamformed signal from a RIS. For example, referring to FIG. 8, the measurements are for the reflected beamformed signal transmitted by the RIS 806 and received by the UE(s) 804 at 810.

In some aspects, the area corresponds to a zone or a sub-zone. For example, referring to FIG. 7, the area corresponds to one of the first area 710*a* or the second area 710*b*.

In some aspects, the measurements may include signal strength measurements. For example, referring to FIG. 8, the measurements received by the primary node 812 at 824 may include signal strength measurements.

At 1210, the network node may transmit a second request to the multiple UEs to provide the measurements to the primary node. For example, referring to FIG. 8, the network node 802 may, at 820*b*, transmit a request to the UE(s) 804 to provide the measurements to the primary node 812. In some aspects, the network node may transmit the second request responsive to receiving the indication from the UE(s) that the UE(s) support a capability to provide respective measurements (at 1004). For example, referring to FIG. 8, the network node 802 may, at 820*b*, transmit a request to the UE(s) 804 to provide the measurements to the primary node 812 responsive to receiving the indication, at 816, from the UE(s) 804 that the UE(s) 804 support a capability to provide respective measurements.

At 1212, the network node may receive an indication, via a first uplink occasion, that the primary node intends to report the measurement information. For example, referring to FIG. 8, the network node 802 may receive an indication, via a first uplink occasion, that the primary node 812 intends to report the measurement information.

At 1214, the network node may receive, from the primary node, measurement information collected from the multiple UEs within the area. For example, referring to FIG. 8, the network node 802 may, at 828, receive, from the primary node 812 measurement information collected from UE(s) 804 within the area.

In some aspects, as part of 1214, at 1216, the network node may periodically receive the measurement information from the primary node. For example, referring to FIG. 8, the network node 802, at 828, may periodically receive the measurement information from the primary node 812.

In some aspects, as part of 1214, at 1218, the network node may receive the measurement information via second uplink occasion(s) assigned to the primary node by the network node. For example, referring to FIG. 8, the network node 802 may, at 828, receive the measurement information via second uplink occasion(s) assigned to the primary node 812 by the network node 802.

In some aspects, as part of 1214, at 1220, the network node may receive, from the primary node, an alert that indicates that the measurements meet a threshold condition. For example, referring to FIG. 8, the network node 802 may, at 828, receive, from the primary node 812, an alert that indicates that the measurements meet a threshold condition.

In some aspects, the measurement information may include one or more statistics associated with the measurements. For example, referring to FIG. 8, the measurement information received by the network node 802 at 828 may include the statistic(s) associated with the measurements determined by the primary node 812 at 826.

In some aspects, the measurement information may include a sampled subset of the measurements. For example, referring to FIG. 8, the measurement information received by the network node 802 at 828 may include a sampled subset of the measurements (e.g., a down-sampled version of the measurements).

Figure 13:
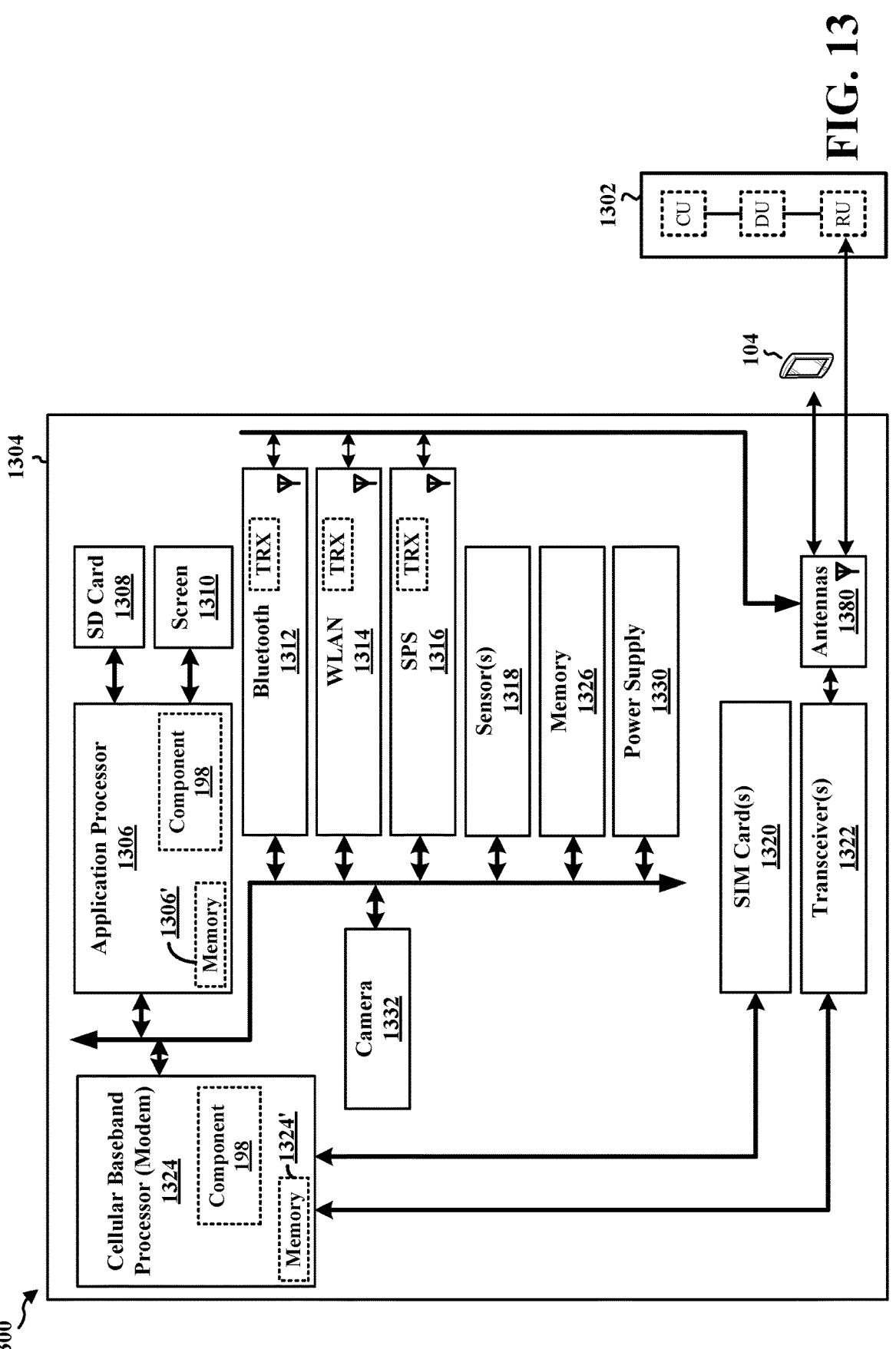
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., sec UE 350 of FIG. 3) and include the additional modules of the apparatus 1304.

As discussed supra, the component 198 may be configured to receive a first request, originating from a network node, to report measurements collected for communication with the network node within an area, to receive the measurements from multiple UEs in the area, and to report measurement information collected from the multiple UEs within the area. The component 198 may be further configured to perform any of the aspects described in connection with the flowchart in FIGS. 9-10 and/or the aspects performed by the primary node 812 in the communication flow in FIG. 8. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for receiving a first request, originating from a network node, to report measurements collected for communication with the network node within an area, means for receiving the measurements from multiple UEs in the area, and means for reporting measurement information collected from the multiple UEs within the area. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
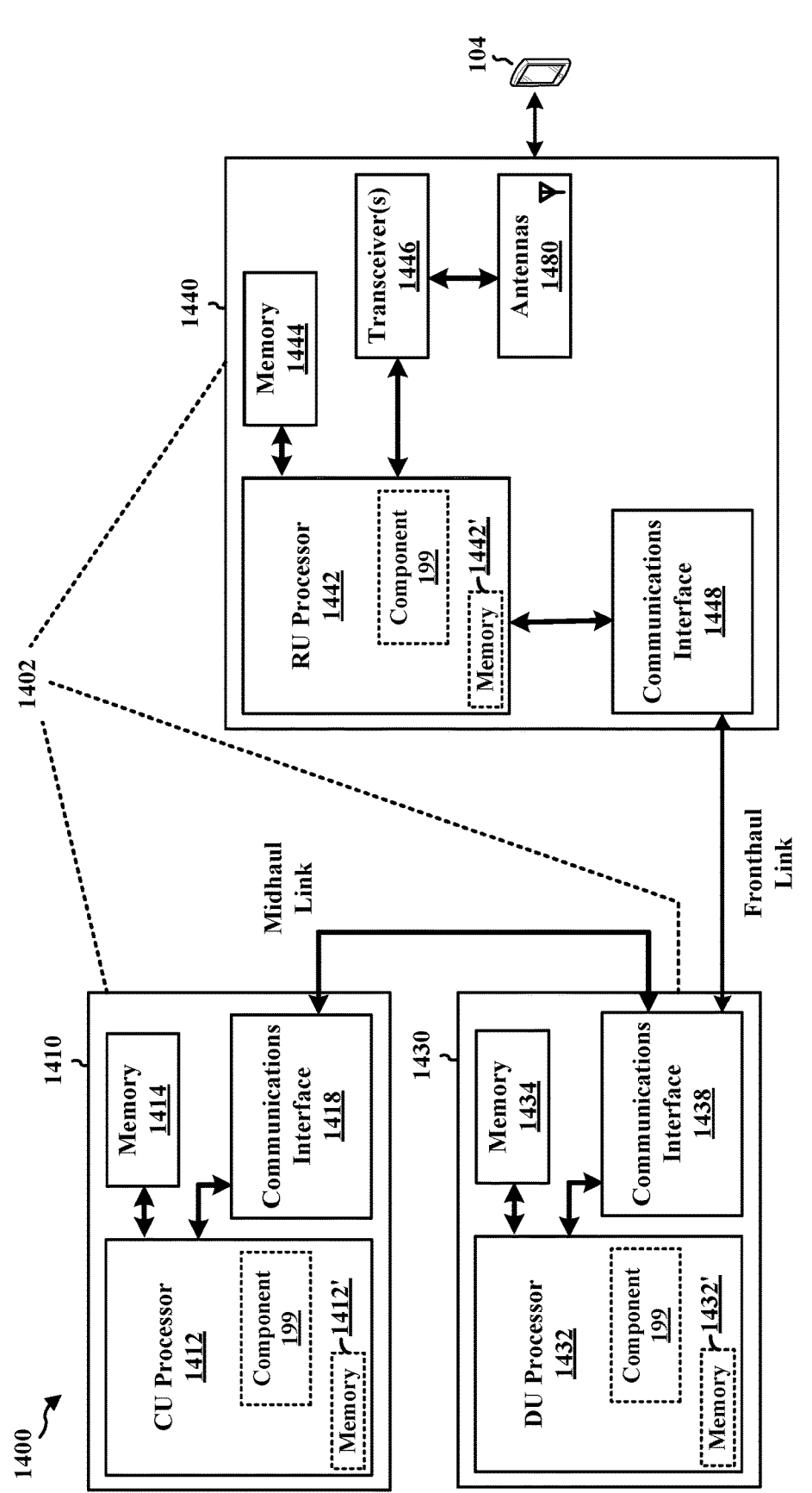
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to provide a first request to a primary node to report measurements collected for communication with the network node within an area, and to receive, from the primary node, measurement information collected from multiple UEs within the area. The component 199 may be further configured to perform any of the aspects described in connection with the flowchart in FIGS. 11-12 and/or the aspects performed by the network node 802 in the communication flow in FIG. 8. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for providing a first request to a primary node to report measurements collected for communication with the network node within an area and means for receiving, from the primary node, measurement information collected from multiple UEs within the area. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Various aspects relate generally to enabling a network to determine whether a RIS is working improperly (e.g., due to security attacks or a blockage). Some aspects more specifically relate to assigning a primary node per area that obtains measurements collected for communication with a network node (e.g., via a beamformed signal from a RIS). In some examples, the measurements for a given RIS configuration and/or the RIS configuration may be reported per zone to the network node. That is, each master node assigned to a particular area may report the measurements collected thereby to the network node. The network node may analyze the measurements and determine whether there is an issue with a RIS (e.g., whether the RIS been compromised (e.g., via a security attack) and/or damaged). Responsive to determining that there is an issue with the RIS, the network (e.g., a network node) may change the network behavior accordingly, for example, by using (e.g., activating) another RIS (e.g., a backup RIS), and/or TRPs.

Particular aspects of the subject matter described in this disclosure can be implemented to realize one or more of the following potential advantages. In some examples, by providing measurement information associated with a RIS configuration to a network node and determining whether an issue exists with the RIS based on the measurement information, the described techniques can be used to improve and benefit both RIS-based systems and non-RIS-based systems. For example, with respect to RIS-based systems, by detecting security attacks on a RIS or detecting damage on a RIS surface based on the measurement information, a remedial action may be taken to ensure that a proper RIS-based beam is provided to a UE. For example, the network may determine whether a RIS is to be powered on or powered off and/or determine whether a configuration of a RIS is to be changed (which may establish beam training to determine an ideal beam for the UE). Such a remedial action may be triggered based on the measurements provided to the network. With respect to non-RIS-based systems, aspects of the present disclosure may enable the determination of active security attacks (such as, denial of service attacks, jamming, etc.), the determination of weak signal strength (e.g., RSRP)/coverage in each area, and may further assist with green (e.g., energy-efficient) communication networks, where the network node deactivates and/or reduces the power of certain TRPs transmit/receive chains, power amplifiers, antennas, etc., based on the reported measurements.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication, including: receiving a first request, originating from a network node, to report measurements collected for communication with the network node within an area; receiving the measurements from multiple UEs in the area; and reporting measurement information collected from the multiple UEs within the area.

Aspect 2 is the method of aspect 1, where the measurements are for a beamformed signal from a RIS.

Aspect 3 is the method of any of aspects 1 and 2, where the area corresponds to a zone or a sub-zone.

Aspect 4 is the method of any of aspects 1 to 3, the method further including: receiving an indication from at least one UE of the multiple UEs that the at least one UE supports a capability to provide respective measurements of the measurements in the area; and responsive to receiving the indication, transmitting a second request to the at least one UE to provide the respective measurements.

Aspect 5 is the method of any of aspects 1 to 3, where the measurements are periodically received from the multiple UEs.

Aspect 6 is the method of any of aspects 1 to 3, the method further including: transmitting a second request to the multiple UEs to provide the measurements, where the measurements are received from the multiple UEs responsive to the second request.

Aspect 7 is the method of any of aspects 1 to 6, the method further including: receiving, from each UE of the multiple UEs, an identifier that identifies the area in which a respective UE is located.

Aspect 8 is the method of any of aspects 1 to 7, where the method is performed at a UE, the method further including: transmitting an indication that indicates at least one of: a first amount of the measurement information that is storable at the UE; a second amount of the measurement information that is processable at the UE; or a processing capability that indicates one or more types of measurement information processing that is supported by the UE.

Aspect 9 is the method of aspect 8, where the first amount and the second amount are based on at least one of: an energy status of the UE; a third amount of power available at the UE; a fourth amount of processing tasks scheduled for the UE; or a power mode of the UE.

Aspect 10 is the method of any of aspects 1 to 9, the method further including: receiving, from each UE of the multiple UEs, an indication that indicates at least one of: a maximum time that respective measurements of the measurements are stored thereby; or that at least a subset of the respective measurements was deleted thereby.

Aspect 11 is the method of any of aspects 1 to 10, where the method is performed at a UE, the method further including: indicating, via a first uplink occasion, that the UE intends to report the measurement information, where reporting the measurement information includes: reporting the measurement information via one or more second uplink occasions assigned to the UE.

Aspect 12 is the method of aspect 11, the method further including: determining that an average of the measurements over time across the multiple UEs meets a threshold condition, where the measurement information is reported via the one or more second uplink occasions in response to determining that the average meets the threshold condition.

Aspect 13 is the method of any of aspects 1 to 12, where the measurement information is periodically reported via the one or more second uplink occasions.

Aspect 14 is the method of any of aspects 1 to 13, where the measurement information includes one or more statistics associated with the measurements.

Aspect 15 is the method of any of aspects 1 to 14, where the measurement information includes a sampled subset of the measurements.

Aspect 16 is the method of any of aspects 1 to 15, where the measurements include signal strength measurements.

Aspect 17 is a method of wireless communication at a network node, including: providing a first request to a primary node to report measurements collected for communication with the network node within an area; and receiving, from the primary node, measurement information collected from multiple UEs within the area.

Aspect 18 is a method of aspect 17, where the measurements are for a beamformed signal from a RIS.

Aspect 19 is a method of aspect 17 and 18, where the area corresponds to a zone or a sub-zone.

Aspect 20 is a method of any of aspects 17 to 19, the method further including: receiving an indication from at least one UE of the multiple UEs that the at least one UE supports a capability to provide respective measurements of the measurements in the area; and responsive to receiving the indication, transmitting a second request to the at least one UE to provide the measurements.

Aspect 21 is a method of any of aspects 17 to 19, the method further including: receiving the measurement information includes periodically receiving the measurement information from the primary node.

Aspect 22 is a method of any of aspects 17 to 19, the method further including: transmitting a second request to the multiple UEs to provide the measurements to the primary node.

Aspect 23 is a method of any of aspects 17 to 22, the method further including: receiving an indication from the primary node that indicates at least one of: a first amount of the measurement information that is storable at the primary node; a second amount of the measurement information that is processable at the primary node; or a processing capability that indicates one or more types of measurement information processing that is supported by the primary node.

Aspect 24 is a method of any of aspects 17 to 23, the method further including: receiving, from the primary node, an indication that indicates at least one of: a maximum time that the measurement information is stored; or at least a portion of the measurement information was deleted.

Aspect 25 is a method of any of aspects 17 to 24, the method further including: receiving an indication, via a first uplink occasion, that the primary node intends to report the measurement information, where receiving the measurement information includes: receiving the measurement information via one or more second uplink occasions assigned to the primary node by the network node.

Aspect 26 is a method of any of aspects 17 to 25, the method further including: receiving, from the primary node, an alert that indicates that the measurements meet a threshold condition.

Aspect 27 is a method of any of aspects 17 to 26, where the measurement information includes at least one of: one or more statistics associated with the measurements; or a sampled subset of the measurements.

Aspect 28 is a method of any of aspects 17 to 27, where the measurements include signal strength measurements.

Aspect 29 is an apparatus for wireless communication. The apparatus includes memory; and at least one processor coupled to the memory and, based at least in part on information stored in the memory, the at least one processor is configured to implement any of aspects 1 to 16.

Aspect 30 is the apparatus of aspect 29, further including at least one of a transceiver or an antenna coupled to the at least one processor.

Aspect 31 is an apparatus for wireless communication at a network node. The apparatus includes memory; and at least one processor coupled to the memory and, based at least in part on information stored in the memory, the at least one processor is configured to implement any of aspects 17 to 28.

Aspect 32 is the apparatus of aspect 31, further including at least one of a transceiver or an antenna coupled to the at least one processor.

Aspect 33 is an apparatus for wireless communication including means for implementing any of aspects 1 to 16.

Aspect 34 is an apparatus for wireless communication including means for implementing any of aspects 17 to 28.

Aspect 35 is a computer-readable medium (e.g., a non-transitory computer-readable medium) storing computer executable code, the code when executed by at least one processor causes the at least one processor to implement any of aspects 1 to 16.

Aspect 36 is a computer-readable medium (e.g., a non-transitory computer-readable medium) storing computer executable code, the code when executed by at least one processor causes the at least one processor to implement any of aspects 17 to 28.

What is claimed is:

1. An apparatus for wireless communication at a user equipment (UE), comprising:

memory; and at least one processor coupled to the memory and, based at least in part on information stored in the memory, the at least one processor is configured to:

receive a first request, originating from a network node, to report measurements from multiple UEs in an area, wherein the measurements are associated with a reconfigurable intelligent surface (RIS) for communication with the network node within the area;

receive the measurements associated with the RIS from multiple UEs in the area; and report measurement information collected from the multiple UEs within the area.

2. The apparatus of claim 1, wherein the measurements are for a beamformed signal from the RIS.

3. The apparatus of claim 1, wherein the area corresponds to a zone or a sub-zone.

4. The apparatus of claim 1, wherein the at least one processor is further configured to:

receive an indication from at least one UE of the multiple UEs that the at least one UE supports a capability to provide respective measurements of the measurements in the area; and responsive to receiving the indication, transmit a second request to the at least one UE to provide the respective measurements.

5. The apparatus of claim 1, wherein to receive the measurements, the at least one processor is configured to periodically receive from the multiple UEs.

6. The apparatus of claim 1, wherein the at least one processor is further configured to:

transmit a second request to the multiple UEs to provide the measurements, wherein the measurements are received from the multiple UEs responsive to the second request.

7. The apparatus of claim 1, wherein the at least one processor is further configured to:

receive, from each UE of the multiple UEs, an identifier that identifies the area in which a respective UE is located.

8. The apparatus of claim 1, wherein the at least one processor is further configured to:

transmit an indication that indicates at least one of:

a first amount of the measurement information that is storable at the UE;

a second amount of the measurement information that is processable at the UE; or a processing capability that indicates one or more types of measurement information processing that is supported by the UE.

9. The apparatus of claim 8, wherein the first amount and the second amount are based on at least one of:
an energy status of the UE;
a third amount of power available at the UE;
a fourth amount of processing tasks scheduled for the UE; or
a power mode of the UE.

10. The apparatus of claim 1, wherein the at least one processor is further configured to:
receive, from each UE of the multiple UEs, an indication that indicates at least one of:
a maximum time that respective measurements of the measurements are stored thereby; or
that at least a subset of the respective measurements was deleted thereby.

11. The apparatus of claim 1, wherein the at least one processor is further configured to:
indicate, via a first uplink occasion, that the UE intends to report the measurement information, wherein to report the measurement information, the at least one processor is configured to:
report the measurement information via one or more second uplink occasions assigned to the UE.

12. The apparatus of claim 11, wherein the at least one processor is further configured to:
determine that an average of the measurements over time across the multiple UEs meets a threshold condition, wherein the measurement information is reported via the one or more second uplink occasions in response to determining that the average meets the threshold condition.

13. The apparatus of claim 11, wherein to report the measurement information, the at least one processor is configured to:
periodically report the measurement information via the one or more second uplink occasions.

14. The apparatus of claim 1, wherein the measurement information comprises one or more statistics associated with the measurements.

15. The apparatus of claim 1, wherein the measurement information comprises a sampled subset of the measurements.

16. The apparatus of claim 1, wherein the measurements comprise signal strength measurements.

17. An apparatus for wireless communication at a network node, comprising:
memory; and
at least one processor coupled to the memory and, based at least in part on information stored in the memory, the at least one processor is configured to:
provide a first request to a primary node corresponding to a user equipment (UE) UE to report measurements from multiple UEs in an area, wherein the measurements are associated with a reconfigurable intelligent surface (RIS) for communication with the network node within the area; and
receive, from the primary node, measurement information based on the measurements associated with the RIS.

18. The apparatus of claim 17, wherein the measurements are for a beamformed signal from the RIS.

19. The apparatus of claim 17, wherein the area corresponds to a zone or a sub-zone.

20. The apparatus of claim 17, wherein the at least one processor is further configured to:

receive an indication from at least one UE of the multiple UEs that the at least one UE supports a capability to provide respective measurements of the measurements in the area; and
responsive to receiving the indication, transmit a second request to the at least one UE to provide the measurements.

21. The apparatus of claim 17, wherein to receive the measurement information, the at least one processor is configured to:
periodically receive the measurement information from the primary node.

22. The apparatus of claim 17, wherein the at least one processor is further configured to:
transmit a second request to the multiple UEs to provide the measurements to the primary node.

23. The apparatus of claim 17, wherein the at least one processor is further configured to:
receive an indication from the primary node that indicates at least one of:
a first amount of the measurement information that is storable at the primary node;
a second amount of the measurement information that is processable at the primary node; or
a processing capability that indicates one or more types of measurement information processing that is supported by the primary node.

24. The apparatus of claim 17, wherein the at least one processor is further configured to:
receive, from the primary node, an indication that indicates at least one of:
a maximum time that the measurement information is stored; or
at least a portion of the measurement information was deleted.

25. The apparatus of claim 17, wherein the at least one processor is further configured to:
receive an indication, via a first uplink occasion, that the primary node intends to report the measurement information, wherein to receive the measurement information, the at least one processor is configured to:
receive the measurement information via one or more second uplink occasions assigned to the primary node by the network node.

26. The apparatus of claim 17, wherein the at least one processor is further configured to:
receive, from the primary node, an alert that indicates that the measurements meet a threshold condition.

27. The apparatus of claim 17, wherein the measurement information comprises at least one of:
one or more statistics associated with the measurements; or
a sampled subset of the measurements.

28. The apparatus of claim 17, wherein the measurements comprise signal strength measurements.

29. A method of wireless communication at a user equipment (UE) comprising:
receiving a first request, originating from a network node, to report measurements from multiple UEs in an area, wherein the measurements are associated with a reconfigurable intelligent surface (RIS) for communication with the network node within the area;
receiving the measurements associated with the RIS from multiple UEs in the area; and
reporting measurement information collected from the multiple UEs within the area.

30. A method of wireless communication at a network node, comprising:

providing a first request to a primary node corresponding to a user equipment (UE) to report measurements from multiple UEs in an area, wherein the measurements are associated with a reconfigurable intelligent surface (RIS) for communication with the network node within the area; and receiving, from the primary node, measurement information based on the measurements associated with the RIS.

\* \* \* \* \*